US008625487B2

(12) United States Patent
Osborn

(10) Patent No.: US 8,625,487 B2
(45) Date of Patent: Jan. 7, 2014

(54) SYSTEM, METHOD, AND COMPUTER-READABLE MEDIUM FOR MOBILE-ORIGINATED VOICE CALL PROCESSING FOR A MOBILE STATION ATTACHED WITH AN IP-FEMTOCELL SYSTEM

(75) Inventor: Christopher Martin Edward Osborn, Allen, TX (US)

(73) Assignee: Ubeeairwalk, Inc. (TW)

( * ) Notice: Subject to any disclaimer, the term of this patent is extended or adjusted under 35 U.S.C. 154(b) by 425 days.

(21) Appl. No.: 12/605,521

(22) Filed: Oct. 26, 2009

(65) Prior Publication Data

US 2010/0048176 A1 Feb. 25, 2010

Related U.S. Application Data

(63) Continuation-in-part of application No. 12/252,231, filed on Oct. 15, 2008, now Pat. No. 8,194,590, and a continuation-in-part of application No. 12/252,238, filed on Oct. 15, 2008, and a continuation-in-part of application No. 12/252,246, filed on Oct. 15, 2008, now Pat. No. 8,351,901.

(60) Provisional application No. 61/003,151, filed on Nov. 15, 2007.

(51) Int. Cl.
*H04W 4/00* (2009.01)
*H04M 1/66* (2006.01)
*H04M 1/68* (2006.01)

(52) U.S. Cl.
USPC .................. 370/328; 455/411; 455/435.1

(58) Field of Classification Search
USPC .................. 370/252, 328; 455/411, 435.1
See application file for complete search history.

(56) References Cited

U.S. PATENT DOCUMENTS

| 6,070,073 | A | 5/2000 | Maveddat et al. |
| 6,438,369 | B1 * | 8/2002 | Huang et al. ............... 455/417 |
| 6,668,166 | B1 * | 12/2003 | Kanabar .................... 455/411 |
| 7,031,747 | B2 | 4/2006 | Cry et al. |
| 7,127,248 | B1 | 10/2006 | Costa et al. |
| 7,970,398 | B2 * | 6/2011 | Palamara et al. ......... 455/435.1 |
| 7,990,912 | B2 * | 8/2011 | Nix et al. ..................... 370/328 |
| 2003/0119518 | A1 | 6/2003 | Cleveland et al. |
| 2005/0101329 | A1 | 5/2005 | Gallagher |
| 2005/0113094 | A1 * | 5/2005 | Dumser et al. ............. 455/439 |
| 2005/0186948 | A1 | 8/2005 | Gallagher et al. |
| 2007/0014281 | A1 | 1/2007 | Kant |
| 2007/0238448 | A1 | 10/2007 | Gallagher et al. |
| 2007/0243872 | A1 | 10/2007 | Gallagher et al. |
| 2007/0254648 | A1 | 11/2007 | Zhang et al. |
| 2008/0096553 | A1 | 4/2008 | Saksena et al. |
| 2008/0244148 | A1 * | 10/2008 | Nix et al. .................... 710/313 |
| 2008/0293382 | A1 * | 11/2008 | Lubenski et al. ........... 455/411 |

(Continued)

*Primary Examiner* — Farah Faroul

(57) ABSTRACT

A system, method, and computer readable medium that facilitates processing of a mobile-originated voice call for a mobile station attached with a femtocell system are provided. The femtocell system may broadcast a notification that authentication is required for all system access, e.g., via an overhead message train. The femtocell system receives a call origination request from the mobile station and, in turn, issues a service request message to a convergence server deployed in a core network. The convergence server then engages in an authentication procedure with the mobile station's mobile core network and returns a global challenge response to the femtocell system. Then convergence server may then determine if the mobile station is to be validated and, if so, may continue call set up for the call origination request.

17 Claims, 12 Drawing Sheets

(56) References Cited

U.S. PATENT DOCUMENTS

| | | |
|---|---|---|
| 2008/0304462 A1 | 12/2008 | Burgess et al. |
| 2008/0316976 A1* | 12/2008 | Thompson et al. ............ 370/335 |
| 2009/0067417 A1* | 3/2009 | Kalavade et al. ............. 370/356 |
| 2009/0094683 A1* | 4/2009 | Morgan et al. ..................... 726/4 |
| 2009/0111427 A1* | 4/2009 | Mack et al. ................... 455/411 |
| 2009/0156213 A1* | 6/2009 | Spinelli et al. ................ 455/436 |
| 2009/0172397 A1* | 7/2009 | Kim .............................. 713/168 |
| 2009/0191844 A1* | 7/2009 | Morgan et al. ................. 455/411 |
| 2010/0151868 A1* | 6/2010 | Shinozaki ..................... 455/445 |
| 2011/0269428 A1* | 11/2011 | Morgan et al. ................. 455/411 |
| 2011/0286389 A1* | 11/2011 | Atarius et al. ................ 370/328 |
| 2012/0184249 A1* | 7/2012 | Morgan et al. ................. 455/411 |

* cited by examiner

940 ⟶

```
<?xml version="1.0" encoding="UTF-8"?>
<bsap-message type="3GPP2">         ⟵ 942                              ⟵ 944
        <global-challenge-response msgid="32-bit integer" successful-auth="true.false"
          ⟵ 946              ⟵ 948           ⟵ 950              ⟵ 952
authtoken="32-bit-integer" cdmaplcm="6 octets" smekey="8 octets" vpmask="66 octets" />
</bsap-message>
```

```
<?xml version="1.0" encoding="UTF-8"?>
<bsap-message type="3GPP2">                 ⟵ 962
        <authentication-token token="32-bit integer received in previous global-
challenge-response" />
</bsap-message>
```

```
<?xml version="1.0" encoding="UTF-8"?>
<bsap-message type="3GPP2">
        <paging-authentication-request msgid="32-bit-integer" rand="93A546BD"
        authr="03354C" count="2E"/>
</bsap-message>
```

Figure 11

SYSTEM, METHOD, AND COMPUTER-READABLE MEDIUM FOR MOBILE-ORIGINATED VOICE CALL PROCESSING FOR A MOBILE STATION ATTACHED WITH AN IP-FEMTOCELL SYSTEM

CROSS REFERENCE TO RELATED APPLICATIONS

This application is a continuation-in-part of U.S. Ser. No. 12/252,231 filed Oct. 15, 2008, entitled, "SYSTEM, METHOD, AND COMPUTER-READABLE MEDIUM FOR PROCESSING CALL ORIGINATIONS BY A FEMTOCELL SYSTEM", this application is also a continuation-in-part of U.S. Ser. No. 12/252,238 filed Oct. 15, 2008, entitled, "SYSTEM, METHOD, AND COMPUTER-READABLE MEDIUM FOR SHORT MESSAGE SERVICE PROCESSING BY A FEMTOCELL SYSTEM", this application is also a continuation-in-part of U.S. Ser. No. 12/252,246 filed on Oct. 15, 2008, entitled, "SYSTEM, METHOD, AND COMPUTER-READABLE MEDIUM FOR USER EQUIPMENT REGISTRATION AND AUTHENTICATION PROCESSING BY A FEMTOCELL SYSTEM" the disclosures of each of which are incorporated herein by reference and each of which claims priority to U.S. provisional patent application Ser. No. 61/003,151, entitled, "SIP-IOS adapter function", filed Nov. 15, 2007, the disclosure of which is incorporated herein by reference. Incorporated by reference is U.S. Ser. No. 12/252,237 filed Oct. 15, 2008, entitled, "SYSTEM, METHOD, AND COMPUTER-READABLE MEDIUM FOR CALL TERMINATION PROCESSING BY A FEMTOCELL SYSTEM" and U.S. Ser. No. 12/252,242 filed Oct. 15, 2008, entitled, "SYSTEM, METHOD, AND COMPUTER-READABLE MEDIUM FOR SHORT MESSAGE SERVICE TERMINATION PROCESSING BY A FEMTOCELL SYSTEM" and U.S. Ser. No. 12/252,199 filed Oct. 15, 2008, entitled, "SYSTEM, METHOD, AND COMPUTER-READABLE MEDIUM FOR IP-FEMTOCELL PROVISIONED RADIO ACCESS NETWORK" and U.S. Ser. No. 12/252,202 filed Oct. 15, 2008, entitled, "SYSTEM, METHOD, AND COMPUTER-READABLE MEDIUM FOR USER EQUIPMENT HANDOFF WITHIN AN IP-FEMTOCELL NETWORK" and U.S. Ser. No. 12/252,204 filed Oct. 15, 2008, entitled, "SYSTEM, METHOD, AND COMPUTER-READABLE MEDIUM FOR USER EQUIPMENT ACQUISITION OF AN IP-FEMTOCELL SYSTEM" and U.S. Ser. No. 12/252,210 filed Oct. 15, 2008, entitled, "SYSTEM, METHOD, AND COMPUTER-READABLE MEDIUM FOR USER EQUIPMENT HANDOFF FROM A MACROCELLULAR NETWORK TO AN IP-FEMTOCELL NETWORK" and U.S. Ser. No. 12/252,212 filed Oct. 15, 2008, entitled, "SYSTEM, METHOD, AND COMPUTER-READABLE MEDIUM FOR CONFIGURATION OF AN IP-FEMTOCELL SYSTEM" and U.S. Ser. No. 12/252,217 filed Oct. 15, 2008, entitled, "SYSTEM, METHOD, AND COMPUTER-READABLE MEDIUM FOR MOBILE-TO-MOBILE CALLS WITHIN FEMTOCELL NETWORK" and U.S. Ser. No. 12/252,222 filed Oct. 15, 2008, entitled, "SYSTEM, METHOD, AND COMPUTER-READABLE MEDIUM FOR ACCESS RESTRICTION OF USER EQUIPMENT DEVICES IN AN IP-FEMTOCELL SYSTEM" and U.S. Ser. No. 12/252,226 filed Oct. 15, 2008 entitled, "SYSTEM, METHOD, AND COMPUTER-READABLE MEDIUM FOR ABBREVIATED-CODE DIALING IN A NETWORK SYSTEM" and U.S. Ser. No. 12/252,227 filed Oct. 15, 2008, entitled, "SYSTEM, METHOD, AND COMPUTER-READABLE MEDIUM FOR MULTI-STAGE TRANSMIT PROTECTION IN A FEMTOCELL SYSTEM" and U.S. Ser. No. 12/252,234 filed Oct. 15, 2008, entitled, "SYSTEM, METHOD, AND COMPUTER-READABLE MEDIUM FOR MOBILE TERMINATED CALL PROCESSING BY A FEMTOCELL SYSTEM" and PCT Ser. No. PCT/US08/80031 filed Oct. 15, 2008, PCT, entitled, "SYSTEM, METHOD, AND COMPUTER-READABLE MEDIUM FOR PROCESSING CALL ORIGINATIONS BY A FEMTOCELL SYSTEM" and PCT Ser. No. PCT/US08/80032 filed Oct. 15, 2008, PCT, entitled, "SYSTEM, METHOD, AND COMPUTER-READABLE MEDIUM FOR SHORT MESSAGE SERVICE PROCESSING BY A FEMTOCELL SYSTEM" and PCT Ser. No. PCT/US08/80033 filed Oct. 15, 2008, PCT, entitled, "SYSTEM, METHOD, AND COMPUTER-READABLE MEDIUM FOR USER EQUIPMENT REGISTRATION AND AUTHENTICATION PROCESSING BY A FEMTOCELL SYSTEM". Incorporated by reference are the following patent applications filed on even date herewith, entitled, "SYSTEM, METHOD, AND COMPUTER-READABLE MEDIUM FOR MOBILE STATION AUTHENTICATION AND REGISTRATION VIA AN IP-FEMTOCELL", entitled, "SYSTEM, METHOD, AND COMPUTER-READABLE MEDIUM FOR AUTHENTICATION CENTER-INITIATED AUTHENTICATION PROCEDURES FOR A MOBILE STATION ATTACHED WITH AN IP-FEMTOCELL SYSTEM", entitled, "SYSTEM, METHOD, AND COMPUTER-READABLE MEDIUM FOR MOBILE-TERMINATED VOICE CALL PROCESSING FOR A MOBILE STATION ATTACHED WITH AN IP-FEMTOCELL SYSTEM", entitled, "SYSTEM, METHOD, AND COMPUTER-READABLE MEDIUM FOR INDIRECT ROUTING OF MOBILE-ORIGINATED SMS MESSAGES FOR A MOBILE STATION ATTACHED WITH AN IP-FEMTOCELL SYSTEM", entitled, "SYSTEM, METHOD, AND COMPUTER-READABLE MEDIUM FOR MOBILE-TERMINATED SMS MESSAGE DELIVERY FOR A MOBILE STATION ATTACHED WITH AN IP-FEMTOCELL SYSTEM".

FIELD OF THE INVENTION

The present invention is generally related to radio access technologies and, more particularly, to mechanisms for facilitating mobile station registration and authentication via a femtocell system.

BACKGROUND OF THE INVENTION

Contemporary cellular radio systems, or mobile telecommunication systems, provide an over-the-air interface to wireless mobile stations (MSs), also referred to as user equipments (UEs), via a radio access network (RAN) that interfaces with at least one core network. The RAN may be implemented as, for example, a CDMA2000 RAN, a Universal Mobile Telecommunications System (UMTS) RAN, a Global System for Mobile communications (GSM) RAN, or another suitable radio access network implementation. The MSs may comprise, for example, a mobile terminal such as a mobile telephone, a laptop computer featuring mobile telephony software and hardware, a personal digital assistant (PDA), or other suitable equipment adapted to transfer and receive voice or data communications with the radio access network.

A RAN covers a geographical area comprised of any number of cells each comprising a relatively small geographic area of radio coverage. Each cell is provisioned by a cell site that includes a radio tower, e.g., a base transceiver station (BTS), and associated equipment. BTSs communicate with MSs over an air interface within radio range of the BTSs.

Numerous BTSs in the RAN may be communicatively coupled to a base station controller (BSC), also commonly referred to as a radio network controller (RNC). The BSC manages and monitors various system activities of the BTSs serviced thereby. BSCs are typically coupled with at least one core network.

BTSs are typically deployed by a carrier network in areas having a high population density. The traffic capacity of a cell site is limited by the site's capacity and affects the spacing of cell sites. In suburban areas, sites are often up to two miles apart, while cell sites deployed in dense urban areas may be as close as one-quarter of a mile apart. Because the traffic capacity of a cell site is finitely limited, as is the available frequency spectrum, mobile operators have a vested interest in technologies that allow for increased subscriber capacity.

A microcell site comprises a cell in a mobile phone network that covers a limited geographic area, such as a shopping center, hotel, airport, or other infrastructure that may have a high density mobile phone usage. A microcell typically uses power control to limit the radius of the microcell coverage. Typically a microcell is less than a mile wide.

Although microcells are effective for adding network capacity in areas with high mobile telephone usage, microcells extensively rely on the RAN, e.g., a controlling BSC and other carrier functions. Because contemporary BSCs have limited processing and interface capacity, the number of BTSs—whether microcell BTSs or typical carrier BTSs—able to be supported by the BSC or other RAN functions is disadvantageously limited.

Contemporary interest exists in providing enterprise and office access, including small office/home office (SOHO) radio access, by an even smaller scale BTS. The radio coverage area of such a system is typically referred to as a femtocell. In a system featuring a femtocell, an MS may be authorized to operate in the femtocell when proximate the femtocell system, e.g., while the MS is located in the SOHO. When the MS moves beyond the coverage area of the femtocell, the MS may then be serviced by the carrier network. The advantages of deployment of femtocells are numerous. For instance, mobile users frequently spend large amounts of time located at, for example, home, and many such users rely extensively on cellular network service for telecommunication services during these times. For example, a recent survey indicated that nearly thirteen percent of U.S. cell phone customers do not have a landline telephone and rely solely on cell phones for receiving telephone service. From a carrier perspective, it would be advantageous to have telephone services provisioned over a femtocell system, e.g., deployed in the user's home, to thereby reduce the load and effectively increase the capacity on the carrier RAN infrastructure. However, no efficient mechanisms have been provided for efficiently providing a convergence of femtocell and macrocellular systems in a manner that facilitates processing of mobile station call-originations.

Therefore, what is needed is a mechanism that overcomes the described problems and limitations.

SUMMARY OF THE INVENTION

The present invention provides a system, method, and computer readable medium that facilitates processing of a mobile-originated voice call for a mobile station attached with a femtocell system. The femtocell system may broadcast a notification that authentication is required for all system access, e.g., via an overhead message train. The femtocell system receives a call origination request from the mobile station and, in turn, issues a service request message to a convergence server deployed in a core network. The convergence server then engages in an authentication procedure with the mobile station's mobile core network and returns a global challenge response to the femtocell system. Then convergence server may then determine if the mobile station is to be validated and, if so, may continue call set up for the call origination request.

In accordance with an embodiment, a method of facilitating processing of a mobile-originated voice call for a mobile station attached with a femtocell system is provided. The method includes receiving, by the femtocell system, a call origination request from the mobile station, transmitting, by the femtocell system, authentication data in a service request message to a convergence server deployed in a core network, receiving, by the femtocell system, a global challenge response from the convergence server, and receiving, by the femtocell system, a determination of validation for the voice call from the convergence server.

In accordance with another embodiment, a computer-readable medium having computer-executable instructions tangibly embodied thereon for execution by a processing system for facilitating processing of a mobile-originated voice call for a mobile station attached with a femtocell system is provided. The computer-readable medium comprises instructions that, when executed, cause the processing system to notify, by the femtocell system, the mobile station that authentication is required by the mobile station for system access, receive, by the femtocell system, a call origination request from the mobile station, transmit, by the femtocell system, authentication data in a service request message to a convergence server deployed in a core network, receive, by the femtocell system, a global challenge response from the convergence server, and receive, by the femtocell system, a determination of validation for the voice call from the convergence server.

In accordance with another embodiment, a network system that facilitates processing of a mobile-originated voice call for a mobile station attached with a femtocell system is provided. The system comprises a core network that includes a convergence server, a mobile core network that includes an authentication center and a Home Location Register, and an Internet Protocol-based femtocell system that provides a radio access point for a mobile station. The femtocell system receives a call origination request from the mobile station, transmits authentication data in a service request message to the convergence server, receives a global challenge response from the convergence server, and receives a determination of validation for the voice call from the convergence server.

BRIEF DESCRIPTION OF THE DRAWINGS

Aspects of the present disclosure are best understood from the following detailed description when read with the accompanying figures, in which:

FIG. 9B is a diagrammatic representation of a global challenge response message transmitted to the femtocell system from the convergence server in accordance with an embodiment;

FIG. 9C is a diagrammatic representation of an authentication token message transmitted from the femtocell system to the convergence server in accordance with an embodiment;

FIG. 11 is a diagrammatic representation of a paging authentication request message transmitted from the femtocell system to the convergence server in accordance with an embodiment.

DETAILED DESCRIPTION OF THE INVENTION

It is to be understood that the following disclosure provides many different embodiments or examples for implementing different features of various embodiments. Specific examples of components and arrangements are described below to simplify the present disclosure. These are, of course, merely examples and are not intended to be limiting.

Figure 1:
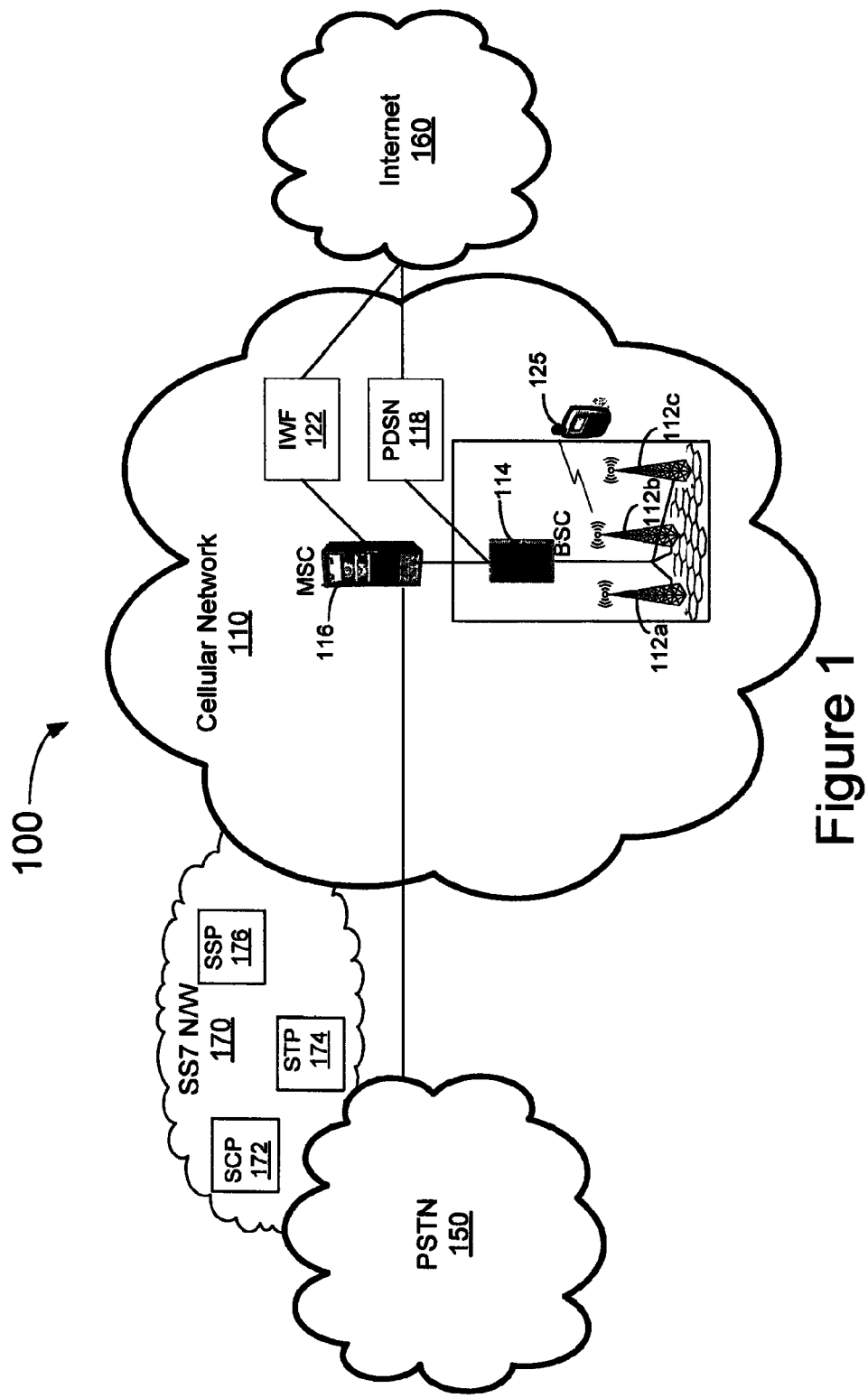
FIG. 1 is a diagrammatic representation of a network system that includes a cellular network adapted to provide macro-cellular coverage to a mobile station.

FIG. 1 is a diagrammatic representation of a network system 100 that includes a cellular network 110 adapted to provide macro-cellular coverage to a mobile station. Cellular network 110 may comprise, for example, a code-division multiple access (CDMA) network, such as a CDMA-2000 network.

Cellular network 110 may include any number of base transceiver stations (BTSs) 112a-112c communicatively coupled with a base station controller (BSC) 114 or RNC. Each individual BTS 112a-112c under the control of a given BSC may define a radio cell operating on a set of radio channels thereby providing service to an MS 125, such as a mobile terminal. BSC 114 manages the allocation of radio channels, receives measurements from mobile terminals, controls handovers, as well as various other functions as is understood. BSC 114 is interconnected with a Mobile Switching Center (MSC) 116 that provides mobile terminal exchange services. BSC 114 may be additionally coupled with a packet data serving node (PDSN) 118 or other gateway service that provides a connection point between the CDMA radio access network and a packet network, such as Internet 160, and provides mobility management functions and packet routing services. MSC 116 may communicatively interface with a circuit switched network, such as the public switched telephone network (PSTN) 150, and may additionally be communicatively coupled with an interworking function (IWF) 122 that provides an interface between cellular network 110 and PSTN 150.

System 100 may also include a signaling system, such as a signaling system #7 (SS7) network 170. SS7 network 170 provides a set of telephony signaling protocols which are used to set up the vast majority of the world's PSTN telephone calls. SS7 network 170 is also used in cellular networks for circuit switched voice and packet-switched data applications. As is understood, SS7 network 170 includes various signaling nodes, such as any number of service control points (SCPs) 172, signal transfer points (STPs) 174, and service switching points (SSPs) 176.

BTSs 112a-112c deployed in cellular network 110 may service numerous network 110 subscribers. Cell cites provided by BTSs 112a-112c commonly feature site ranges of a quarter to a half mile, e.g., in densely populated urban areas, to one to two miles in suburban areas. In other remotely populated regions with suitable geography, site ranges may span tens of miles and may be effectively limited in size by the limited transmission distance of relatively low-powered MSs. As referred to herein, a cell provided by a BTS deployed in carrier network 110 for access by any authorized network 110 subscriber is referred to as a macrocell.

Figure 2:
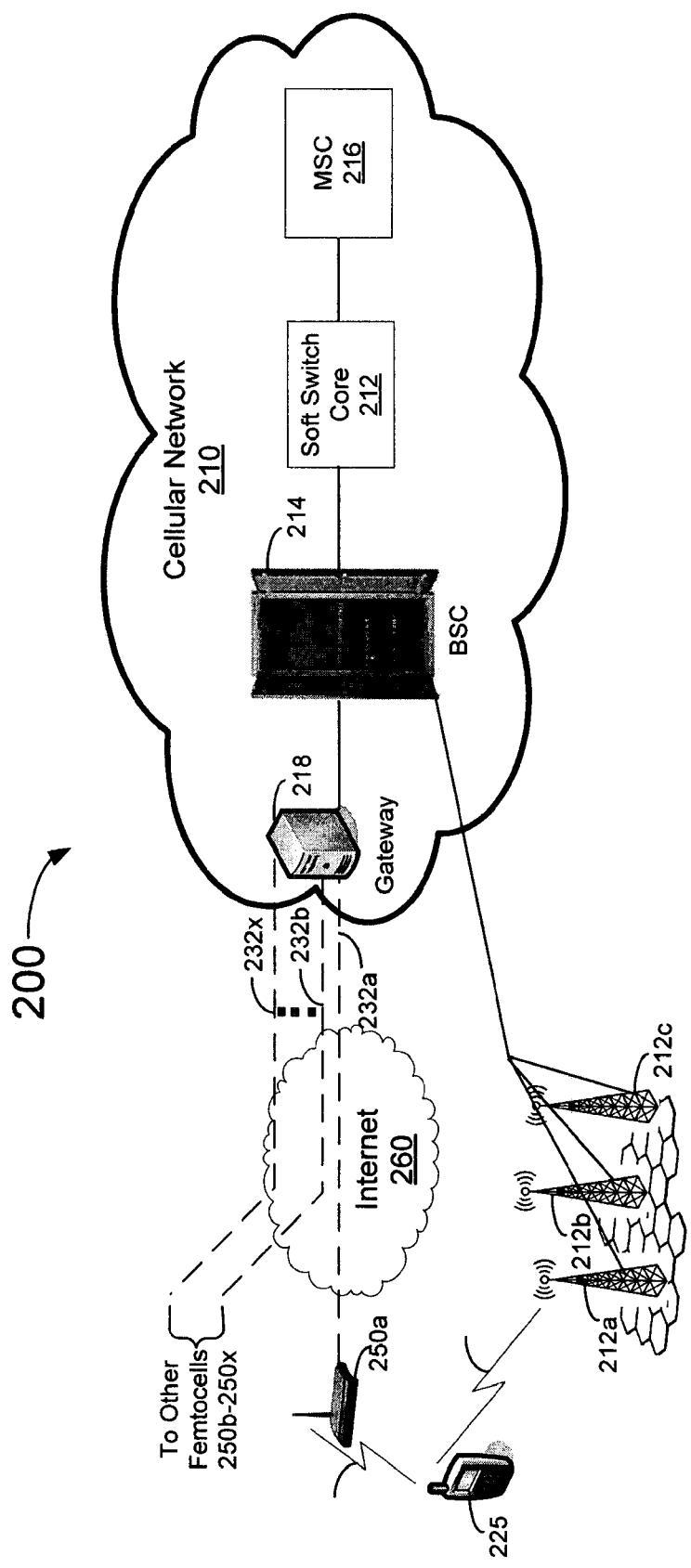
FIG. 2 is a diagrammatic representation of a conventional network system configuration featuring a femtocell system.

FIG. 2 is a diagrammatic representation of a conventional network system 200 configuration featuring a femtocell. In the depicted example, a central BSC 214 deployed in a cellular carrier network 210 may connect with a soft switch core 212 that is connected with a MSC 216. MSC 216 connects with the cellular core network and may interface with other networks, such as the PSTN as is understood. BSC 214 may be connected with and service numerous BTSs 212a-212c that provide macrocells to cellular network 210 subscribers.

BSC 214 may additionally connect with a tunnel gateway system 218 that is adapted to establish secured tunnels 232a-232x with respective femtocell systems 250a-250x. Femtocells comprise cellular access points that connect to a mobile operator's network using, for example, a residential Digital Subscriber Line (DSL) or cable broadband connection. Femtocells 250a-250x provide a radio access point for MS 225 when the MS is within range of a femtocell system with which the MS has authorized access. For example, femtocell system 250a may be deployed in a residence of the user of MS 225. Accordingly, when the user is within the residence, mobile telecommunications may be provided to MS 225 via an air-interface provided by femtocell system 250a. In this instance, MS 225 is effectively offloaded from the macro BTS, e.g., BTS 212a, and communications to and from the MS are carried out with femtocell system 250a over Internet 260. Thus, femtocell systems 250a-250x may reduce the carrier radio resource demands by offloading MSs from macrocells to femtocells and thereby provide for increased subscriber capacity of cellular network 210.

In contemporary implementations such as that depicted in FIG. 2, a femtocell system 250a comprises a transceiver without intelligence and is thus required to be connected and managed by BSC 214. Thus, femtocell systems 250a-250x are reliant on the carrier network centralized BSC 214 which has limited capacity and thus does not exhibit desirable scaling characteristics or capabilities. Moreover, high communications overhead are realized by the BTS backhaul.

Figure 3A:
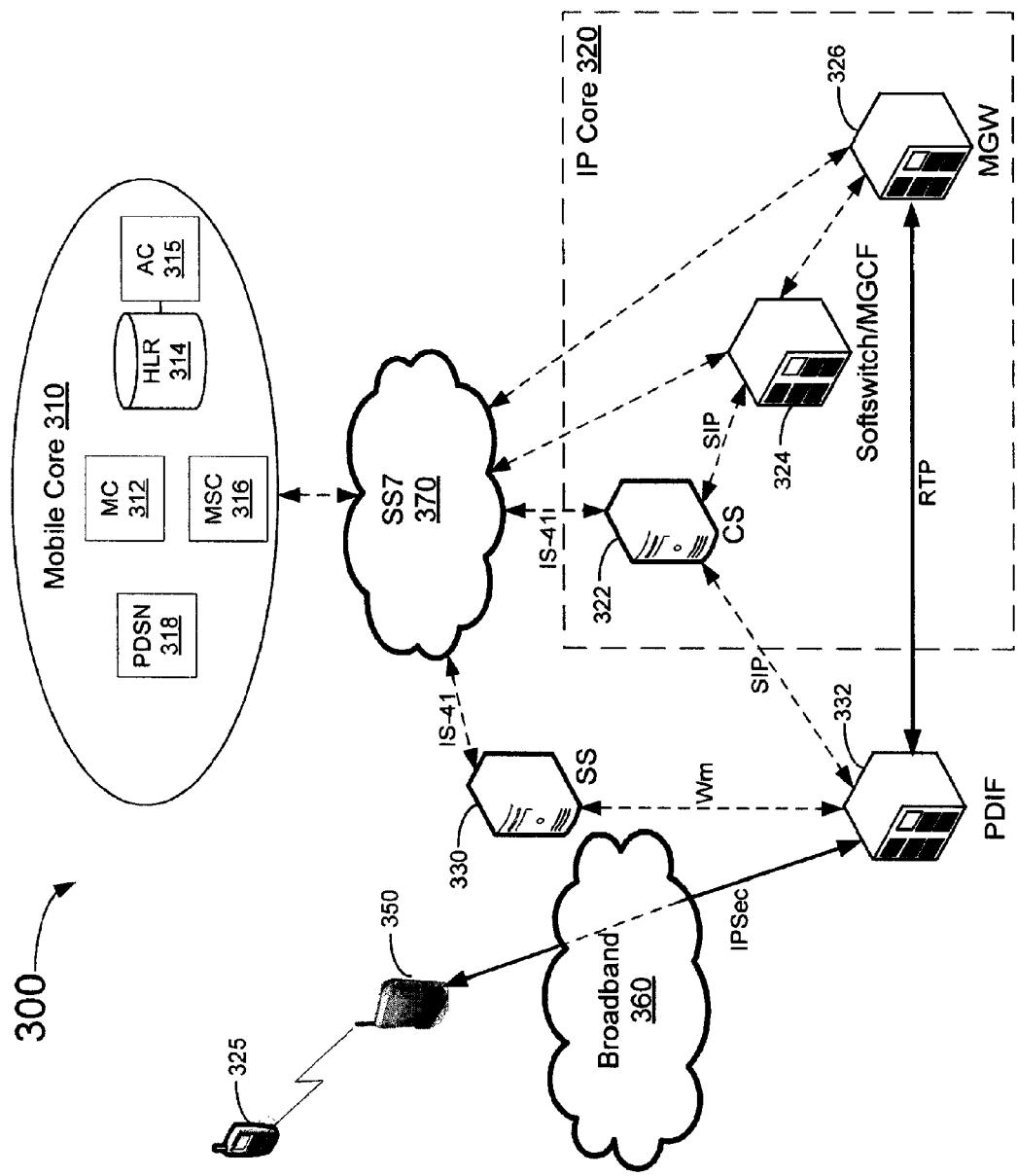
FIG. 3A is a diagrammatic representation of a network system in which a femtocell system implemented in accordance with an embodiment of the invention may be deployed.

FIG. 3A is a diagrammatic representation of a network system 300 in which a femtocell system implemented in accordance with an embodiment of the invention may be deployed. System 300 includes a mobile core network 310 implemented as, for example, a code division multiple access (CDMA) core network that interfaces with a SS7 network 370. Mobile core network 310 may include a Messaging Center (MC) 312, a Home Location Register (HLR) 314, an authentication center (AC) 315, a Mobile Switching Center (MSC) 316, a Packet Data Serving Node (PDSN) 318, and various other components. The HLR 314 is a central database that contains details of each MS subscriber authorized to use the mobile core network 310. There may be several HLRs deployed in the core network 310. The HLR 314 maintains details of each Subscriber Identity Module (SIM) card issued by the mobile network operator, e.g., the International Mobile Subscriber Identity (IMSI) stored in the SIM card, services authorized for the associated user, a location of the MS, and various other information. The HLR 314 may interface with the AC 315 that functions to facilitate authentication of MSs that access the cellular network. The MSC 316 provides mobile terminal exchange services and may communicatively interface with a circuit switched network, such as the public switched telephone network. The MSC 316 handles voice calls and Short Message Service (SMS), sets up and releases end-to-end connections, and handles mobility and hand-over requirements during calls as well as other functions. The PDSN 318 provides an interface between the radio access and IP networks. The PDSN 318 provides, for example, mobility management functions and packet routing functionality.

System 300 includes an Internet Protocol (IP) core network 320 that interfaces with the SS7 network 370, e.g., via IS-41. In accordance with an embodiment, the IP core network 320 includes a convergence server (CS) 322, a softswitch/Media Gateway Controller Function (MGCF) 324, and a Media Gateway (MGW) 326 among other components. The CS 322 may be communicatively coupled with the SS7 network 370 and a Packet Data Interworking Function (PDIF) 332, e.g., via Session Initiation Protocol (SIP) communications. The CS 322 provides SIP registration functions and a central interface point to Voice over Internet Protocol (VoIP) elements and the softswitch/MGCF 324. The CS 322 further provides SIP-MSC and Interworking functions between existing VOIP network elements and the operator's core network. To this end, the CS 322 may interface directly with the MC 312 and the HLR 314 using, for example, a TIA-41 interface.

The softswitch/MGCF 324 may be communicatively coupled with the CS 322, e.g., via SIP communications, with the SS7 network 370, and with the MGW 326. The softswitch/MGCF 324 may connect calls from one device to another and perform call control protocol conversion, for example, between SIP and ISDN User Part (ISUP). The MGW 326 may be communicatively coupled with the SS7 network 370 and the PDIF 332 in addition to the softswitch/MGCF 324. The MGW 326 may convert data between real-time transport protocol (RTP) and pulse code modulation (PCM), and may also be employed for transcoding. Resources of the MGW 326 may be controlled by the softswitch/MGCF 324.

In accordance with an embodiment, the system 300 may include a Security Server (SS) 330 that interfaces with the SS7 network 370, e.g., via IS-41, and the PDIF 332, e.g., via a Wm interface. The PDIF 332 facilitates access to the IP core network 320 via WiFi access points and may be responsible for such services as, for example, security, access, authentication, policy enforcement, user information collection, and IP address allocation as well as other services. The PDIF 332 may interface, e.g., via SIP communications, with the CS 322, and may have Real-time Transport Protocol (RTP) communications with the MGW 326. Further, the PDIF 332 may have secured IP communications, e.g., IPsec, established with one or more femtocell systems, e.g., a femtocell system 350 deployed at a user premise, such as a home office. The secured communications may be established between the PDIF 332 and the femtocell system 350 over, for example, a broadband network 360 interface such as a residential DSL or cable broadband connection. The femtocell system 350, in turn, provides a radio access point for one or more MSs 325 when the MS 325 is within range of the femtocell system 350 with which the MS 325 has authorized access.

In accordance with an embodiment, a femtocell system 350 may include integrated BTS and BSC functions and may feature additional capabilities available in the provided femtocell site coverage area. Femtocell system 350 provides an IP-accessible radio access network, is adapted for operation with IP core network 320, and provides radio link control functions. Femtocell system 350 may be communicatively coupled with broadband network 360 via any variety of backhaul technologies, such as an 802.11x link, a 10/100 BaseT LAN link, a T1/E1 Span or fiber, cable set top box, DSL modem connected with a central office digital subscriber line access multiplexer, a very small aperture terminal (VSAT), or another suitable backhaul infrastructure.

In an embodiment, femtocell system 350 includes a session initiation protocol (SIP) adapter that supports a SIP client pool and provides conversion of call set-up functions to SIP client set-up functions. To this end, the femtocell system 350 may be allocated an IP address. Additionally, femtocell system 350 includes electronic serial number (ESN) screening and/or Mobile Equipment Identifier (MEID) screening to allow only designated MSs to access the femtocell. Configuration of the femtocell system 350 with ESN(s) or MEID(s) may be made as part of an initial femtocell system 350 activation.

In another embodiment, a femtocell system 350 may be implemented as a 3G-compliant entity, e.g., to service UMTS mobile terminals, and may be deployed in a small office/home office (SOHO) or other suitable enterprise. To this end, the femtocell system 350 may include an integrated RNC and radio node (RN). In a particular implementation, the femtocell system 350 may be implemented as an Evolution-Data Optimized (EV-DO) entity, e.g., a 1xEV-DO integrated IP-RAN. The femtocell system 350 provides an IP-accessible radio access network and provides radio link control functions.

Figure 3B:
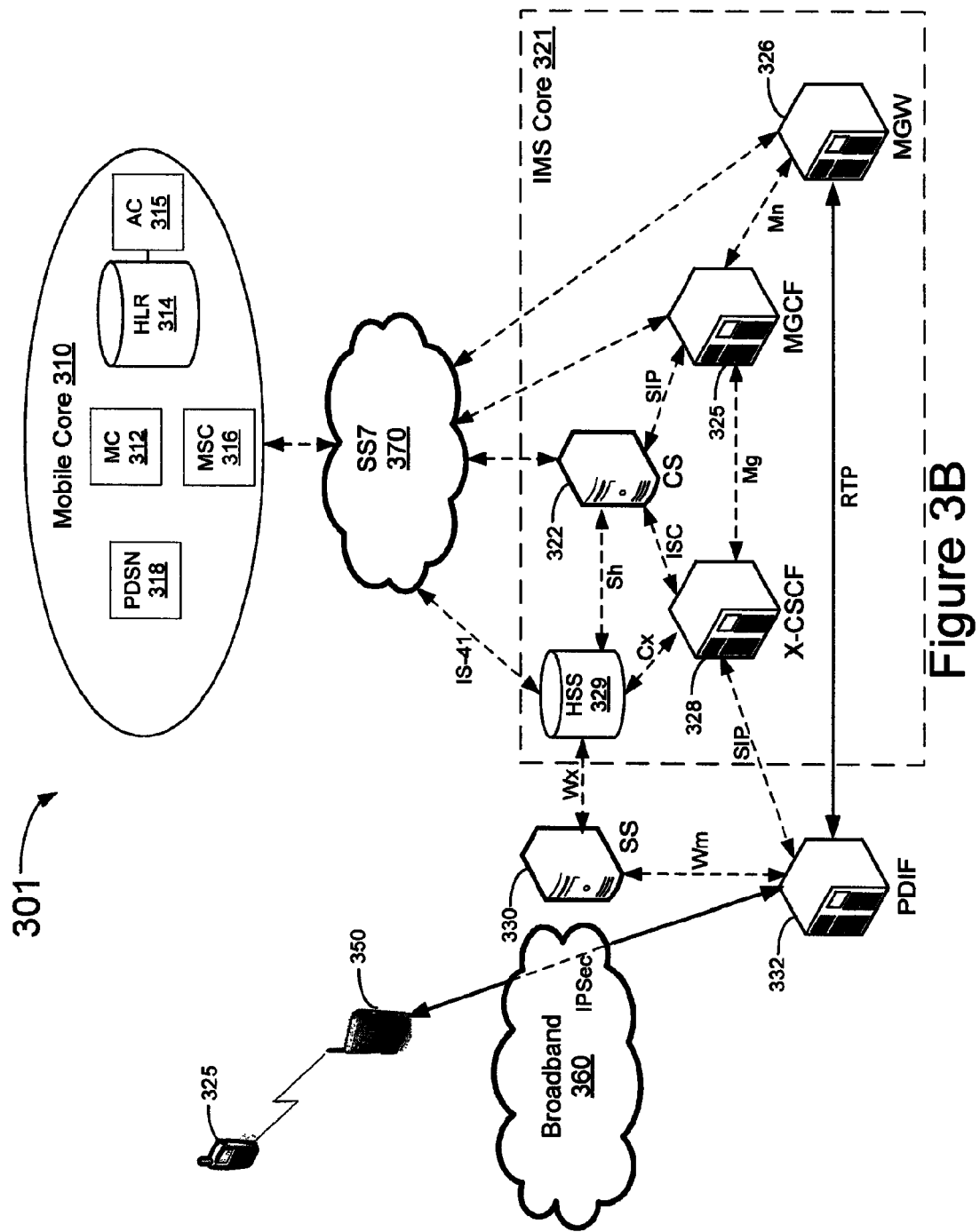
FIG. 3B is a diagrammatic representation of an alternative network system in which a femtocell system implemented in accordance with an embodiment of the invention may be deployed.

FIG. 3B is a diagrammatic representation of an alternative network system 301 in which a femtocell system implemented in accordance with an embodiment of the invention may be deployed. System 301 includes a mobile core network 310 implemented as, for example, a CDMA core network that interfaces with a SS7 network 370. The mobile core network 310 may include an MC 312, an HLR 314, an AC 315, an MSC 316, and a PDSN 318, and various other components as described above with regard to the mobile core network 310 of FIG. 3A.

System 301 includes an IP Multimedia Subsystem (IMS) core network 321 that interfaces with the SS7 network 370. In accordance with an embodiment, the IMS core network 321 includes a CS 322, a MGCF 325, an MGW 326, an X-Call Session Control Function (X-CSCF) 328, and a Home Subscriber Server (HSS) 329 among other components. The X-CSCF 328 processes SIP signaling packets and provides a centralized interface for control and signaling including SIP registration functions in accordance with disclosed embodiments. The X-CSCF 328 may provide Interrogating-CSCF (I-CSCF) services, Proxy-CSCF (P-CSCF) services, and Serving-CSCF (S-CSCF) services. The X-CSCF 328 comprises various SIP servers or proxies that process SIP signaling packets in the IMS core network 321. P-CSCF services provided by X-CSCF may include provisioning a first point of contact for an IMS-compliant MS. In such a situation, the X-CSCF may be located in a visited network or in an MS's home network if the visited network is not fully IMS-compliant. An MS may discover the X-CSCF 328, e.g., by using Dynamic Host Configuration Protocol (DHCP), or by assignment in a packet data protocol context. S-CSCF services provided by the X-CSCF 328 include provisioning as a central node of the signaling plane. To this end, the S-CSCF comprises a SIP server, but additionally performs session control. Further, the X-CSCF 328 is interfaced with the HSS 329 and/or HLR 314 to download and upload user profiles for providing S-CSCF services. The X-CSCF 328 further includes a SIP function for providing I-CSCF services. To this end, the X-CSCF 328 has an IP address that is published in the Domain Name System (DNS) that facilitates location of the X-CSCF 328 by remote servers. Thus, I-CSCF services of the X-CSCF 328 may be used as a forwarding point for receipt of SIP packets within the domain.

The CS 322 may be configured to operate as an IMS application server that interfaces with the X-CSCF 328 using the ISC interface. The HSS 329 comprises a user database that supports IMS network entities that manage or service calls. The HSS 329 contains subscription-related information, e.g., subscriber profiles, may perform authentication and authorization of users, and may provide information about locations of MSs and IP information. In a fully standard IMS architecture, the CS 322 may interface with the HSS 329. However, in other scenarios, the HLR 314 may anchor the service even with the HSS 329 deployed within the system 301. Accordingly, the CS 322 may be communicatively interfaced with the HLR 314 for location updates using, for example, a TIA-41 interface. Further, the CS 322 is preferably interfaced with the MC 312 using, for example, a TIA-41 interface.

The CS 322 may be communicatively coupled with the SS7 network 370, the MGCF 325, e.g., via SIP communications, the X-CSCF 328, e.g., via ISC, and the HSS 329, e.g., via an Sh interface. The MGCF 325 may be communicatively coupled with the MGW 326, e.g., via an Mn interface, the X-CSCF 328, e.g., via an Mg interface, and the SS7 network 370 in addition to the CS 322. The MGW 326 may be communicatively coupled with the SS7 network 370 and a PDIF 332 in addition to the MGCF 325. The MGW 326 may convert data between RTP and PCM, and may also be employed for transcoding. Resources of the MGW 326 may be controlled by the MGCF 325. The X-CSCF 328 may be communicatively coupled with the PDIF 332 for exchanging SIP communications therewith and the HSS 329, e.g., via a Cx interface, in addition to the CS 322 and the MGCF 325. The HSS 329 may be communicatively coupled with the SS7 network 370, e.g., via IS-41, and a SS 330, e.g., via a Wx interface. The SS 330 may be coupled with the PDIF 332, e.g., via a Wm interface.

The PDIF 332 facilitates access to the IMS core network 321 via WiFi access points and may be responsible for such services as, for example, security, access, authentication, policy enforcement, user information collection, and IP address allocation as well as other services. The PDIF 332 may have RTP communications with the MGW 326. Further, the PDIF 332 may have secured IP communications, e.g., IPsec, established with one or more femtocell systems, e.g., a femtocell system 350 deployed at a user premise, such as a home office. The secured communications may be established between the PDIF 332 and the femtocell system 350 over, for example, a broadband network 360 interface such as residential DSL or cable broadband connection. The femtocell system 350, in turn, provides a radio access point for one or more MSs 325 when the MS 325 is within range of the femtocell system 350 with which the MS 325 has authorized access.

Figure 4:
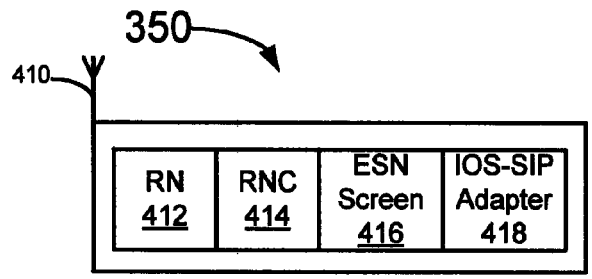
FIG. 4 is a simplified diagrammatic representation of femtocell system that facilitates provisioning of a femto-RAN in accordance with an embodiment.

FIG. 4 is a simplified diagrammatic representation of femtocell system 350 that facilitates provisioning of a femto-RAN in accordance with an embodiment. Femtocell system 350 includes an antenna 410 coupled with a RN 412. RN 412 may be implemented, for example, as a 1xEV-DO ASIC device for provisioning a 1xEV-DO Rev. 0 air interface or a 1xEV-DO Rev. A air interface. RN 412 may be communicatively coupled with a RNC 414 that provides radio control functions, such as receiving measurements from MSs, control of handovers to and from other femtocell systems, and may additionally facilitate handoff to or from macrocells. RNC 414 may also provide encryption/decryption functions, power, load, and admission control, packet scheduling, and various other services.

Femtocell system 350 includes an electronic serial number screening function 416 that may facilitate approving or rejecting service for an MS by femtocell system 350. Additionally, femtocell system 350 includes an Internet Operating System (IOS) and SIP Adapter (collectively referred to as IOS-SIP Adapter 418). IOS-SIP adapter 418 may invoke and manage SIP clients, such as a user agent (UA) pool comprising one or more UAs. Each MS authorized to be serviced by femtocell system 350 may have a UA allocated therefor by femtocell system 350 in a manner that facilitates transmission of communications to and from an MS over an IP backhaul. Accordingly, when an authorized MS is within the femtocell system 350 site range, telecommunication services may be provided to the MS via the IP backhaul and the femtocell system 350 provisioned RAN. When the MS is moved beyond the service range of femtocell system 350, telecommunication service may then be provided to the MS via macrocellular coverage. Femtocell system 350 may perform a DNS/ENUM registration on behalf of MSs authorized to obtain service from femtocell system 350 and may generate and issue a SIP registration on behalf of an MS authorized for service access by the femtocell system 350.

Figure 5:
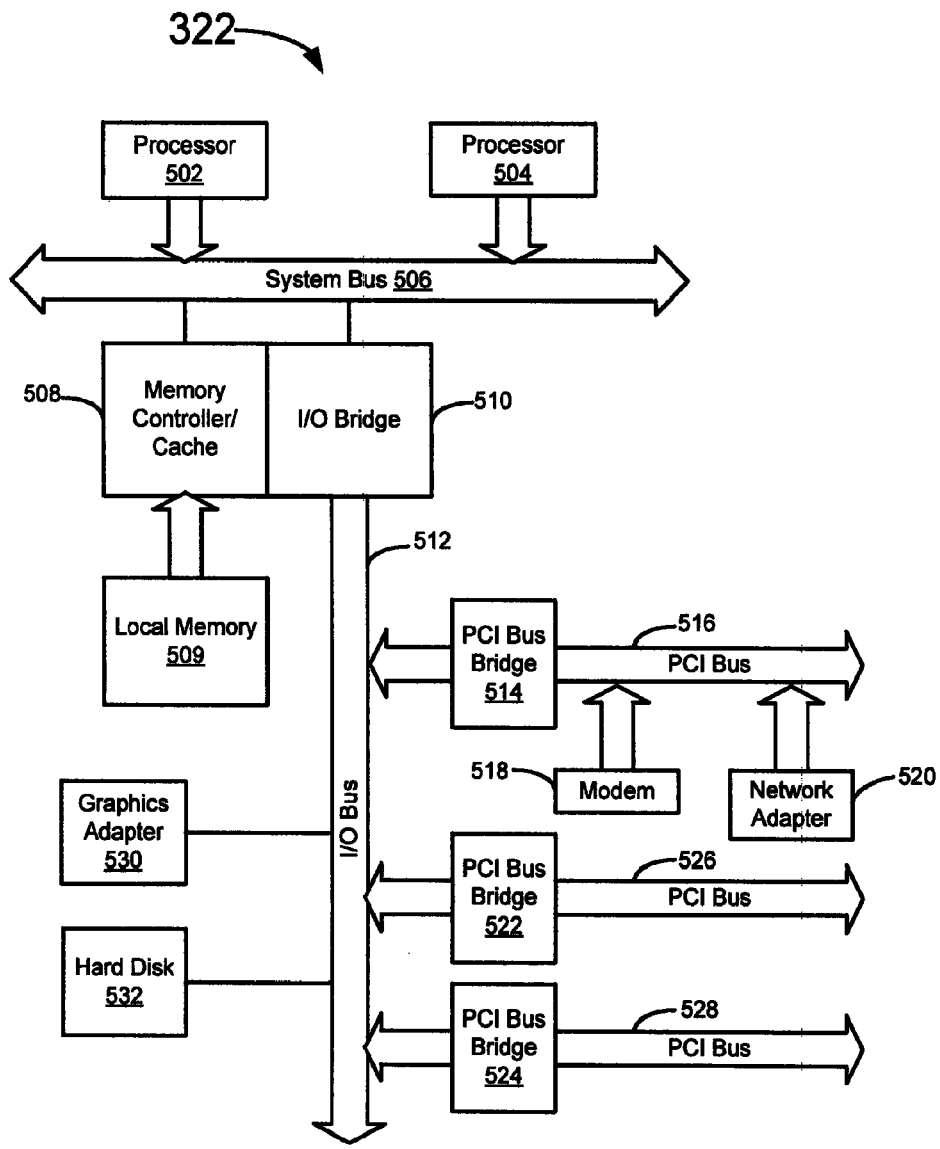
FIG. 5 depicts a block diagram of a data processing system that may be implemented as a convergence server in accordance with an embodiment of the present invention.

FIG. 5 depicts a block diagram of a data processing system that may be implemented as a convergence server 322 in accordance with an embodiment of the present invention. CS 322 may be a symmetric multiprocessor (SMP) system including a plurality of processors 502 and 504 connected to a system bus 506. Alternatively, a single processor system may be employed. Also connected to system bus 506 is memory controller/cache 508 which provides an interface to local memory 509. An I/O bus bridge 510 is connected to system bus 506 and provides an interface to an I/O bus 512. Memory controller/cache 508 and I/O bus bridge 510 may be integrated as depicted.

Peripheral component interconnect (PCI) bus bridge 514 connected to I/O bus 512 provides an interface to PCI local bus 516. A number of modems may be connected to a PCI local bus 216. Communication links to clients may be provided through a modem 518 and network adapter 520 connected to PCI local bus 516 through add-in connectors.

Additional PCI bus bridges 522 and 524 provide interfaces for additional PCI local buses 526 and 528, from which additional modems or network adapters may be supported. In this manner, server 322 allows connections to multiple system nodes. A memory-mapped graphics adapter 530 and hard disk 532 may also be connected to I/O bus 512 as depicted, either directly or indirectly.

Those of ordinary skill in the art will appreciate that the hardware depicted in FIG. 5 may vary. For example, other peripheral devices, such as optical disk drives and the like, also may be used in addition to or in place of the hardware depicted. The depicted example is not meant to imply architectural limitations with respect to the present invention.

While the CS 322 depicted in FIG. 5 comprises an SMP system, it should be understood that any variety of server configurations and implementations may be substituted therefor. The depicted server 322 is provided only to facilitate an understanding of disclosed embodiments, and the configuration of the CS 322 is immaterial with regard to the disclosed embodiments.

In many CDMA networks, a subscriber is uniquely identified by the combination of an electronic serial number (ESN) and a mobile identification number (MIN). A mobile equipment identifier (MEID) is an extension of the ESN that facilitates an increase in the number of manufacturers' codes. A pseudo-ESN (p-ESN) may be derived from the MEID to be used in place of the ESN. The MIN-ESN, or MIN-p-ESN, combination is used primarily for registration and authentication functions. Contemporary CDMA MSs may support an international mobile station identity (IMSI) and use the IMSI in place of the MIN to offer an improved address space and utilization by international applications. With the introduction of IMSI, the concept of a mobile station identity may be either an MIN or an IMSI. Due to the variations in different parameters for identification, it is assumed herein that a unique identifier is included in the username portion of the To Header of a SIP:REGISTER request to create and identify the mobile station subscriber during the registration procedures described hereinbelow. This unique identifier is referred to herein as the register ID (RegID). An optional network dependent predefined prefix may be stripped from the register ID prior to use in the convergence server functions. The register ID may contain an MIN or an IMSI paired with either an MEID, an ESN, or a p-ESN. However, other options may be suitably implemented without departing from the disclosed embodiments.

In accordance with an embodiment, the CS 322 emulates the functionality of a MSC and Visitor Location Register (VLR) to facilitate authentication and registration of MSs in a carrier's CDMA network. To this end, the CS 322 may interface with the HLR 314 for authentication, location updates, and other services using an IS-41 interface.

In a pre-IMS environment, e.g., such as network system 300 depicted in FIG. 3A, the CS 322 receives a SIP:REGISTER message directly from the femtocell system 350, or from the femtocell system 350 acting as a proxy for the MS 325. The CS 322 provides SIP registration functions and is the central interface point to the softswitch/MGCF 324 and VOIP elements.

In an IMS network such as network system 301 depicted in FIG. 3B, the CS 322 functions as an IMS application server, and the IMS infrastructure provides the centralized interface control and signaling including SIP registration functions. In this environment, the femtocell system 350 itself, or alternatively the femtocell system 350 acting as a proxy for the MS 325, sends a SIP:REGISTER (e.g., via other CSCFs) to the S-CSCF which performs a third-party registration of the MS 325 with the CS 322 based on initial filter criteria stored in the HSS 329.

In an embodiment, the femtocell system 350 may be configured to support "Global Challenge" based authentication on all system access (e.g., Registration, Call Origination, Call Termination, and Data Burst messages). The femtocell system may indicate a Global Challenge request by setting an authentication bit (e.g., AUTH=1) in the overhead message train (OMT). The femtocell system 350 may also include a global random challenge value (RAND) used in generating the authentication result by both the MS and the HLR/AC.

The femtocell system preferably establishes an IPsec tunnel over the broadband network with the PDIF 332 or, alternatively, a P-CSCF before sending any SIP traffic to the CS 322. The IPsec tunnel may be established immediately after the femtocell system 350 is powered on or when an MS 325 attempts to establish a connection with the femtocell system 350. In this implementation, the CS 322 is not involved in establishing the IPsec tunnel.

In an embodiment, the CS 322 may be configured to receive CDMA-1x authentication data at the end of a SIP registration message using a SIP:MESSAGE received from the femtocell system 350. In this manner, the CS 322 conveys the result of the 1x authentication and, if needed, performs various authentication procedures, such as a unique challenge, SSD update, and a call history count.

Figure 6:
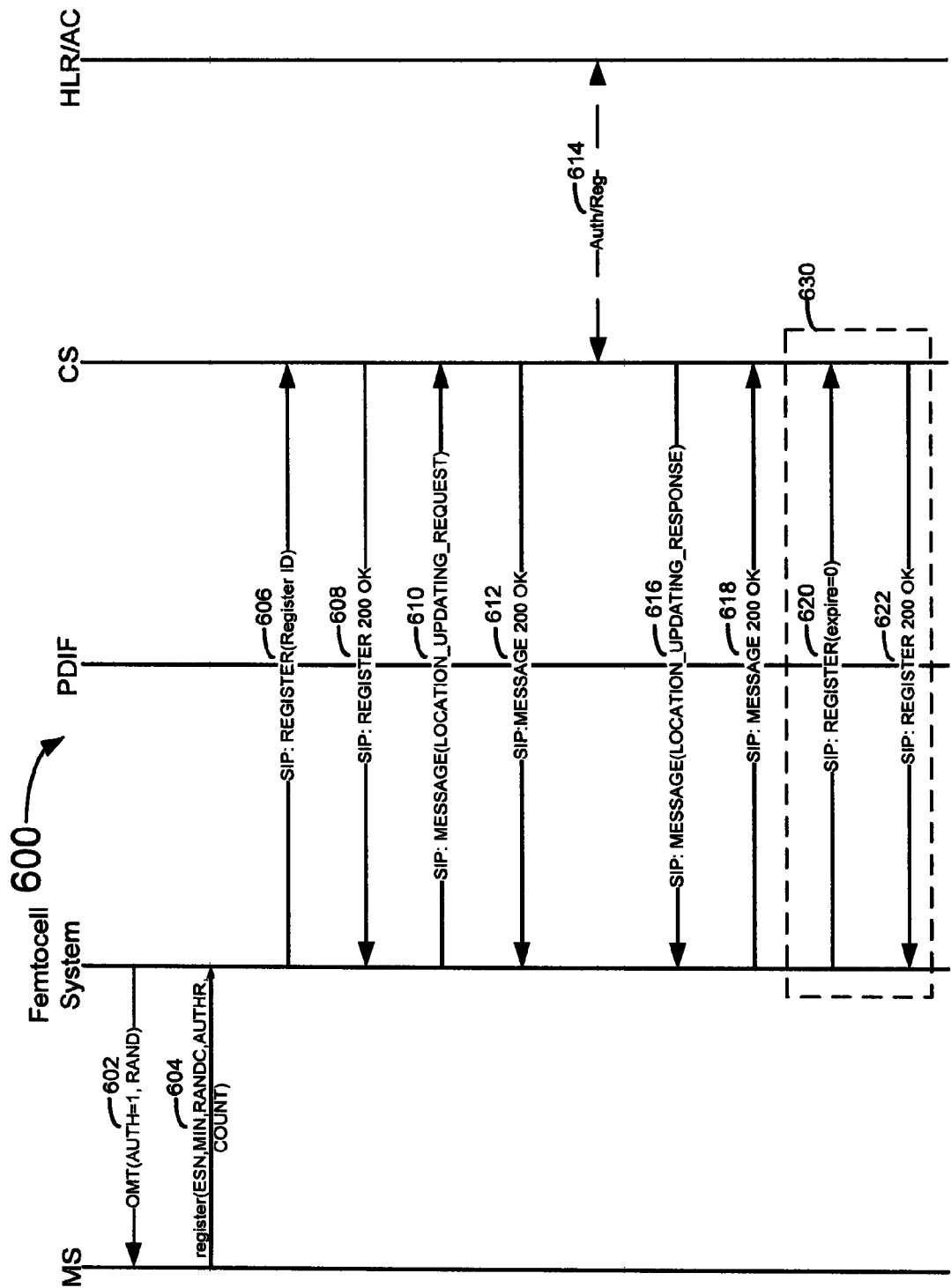
FIG. 6 depicts a diagrammatic representation of a registration and authentication process on initial system access by a mobile station via a femtocell system in a non-Internet Protocol Multimedia Subsystem network implemented in accordance with an embodiment.

FIG. 6 depicts a diagrammatic representation of a registration and authentication process 600 on initial system access by an MS via a femtocell system in a non-IMS network, such as network system 300 depicted in FIG. 3A, implemented in accordance with an embodiment. A SIP registration phase is invoked by transmission of an OMT by the femtocell system 350 (step 602). An OMT facilitates autonomous registration and may, for example, be transmitted on paging/access channels. Transmission of the OMT by the femtocell system 350 may be made at a predefined interval, e.g., once a second. The OMT may include parameters for system and region identification and may be distinguished from OMTs transmitted by other entities, e.g., by macro BTSs. An MS 325 in idle mode may detect the OMT when the MS 325 is within range of the femtocell system 350. In accordance with an embodiment, the OMT transmitted by the femtocell system 350 includes an authentication bit (AUTH) having a value, e.g., "1", that indicates authentication is required for all system access. Further, the OMT includes a random number (RAND) generated by the femtocell system 350.

Based on the values in the OMT, the MS determines that a new serving system has been encountered and that authentication is required based on the authentication bit value (AUTH=1). Subsequently, the MS 325 attempts to obtain the random number (RAND) to be used for the authentication from the OMT. If the random number is not available, a zero value may be used by the MS as prescribed by TR-45 authentication procedures. The MS 325 then generates an authentication result (AUTHR). For example, the MS 325 may generate an authentication result from a shared secret data key (SSD-A) stored by the MS 325, the ESN or p-ESN, the MIN, and the RAND value obtained from the OMT. The authentication result may be generated, for example, by execution of the well known CAVE algorithm by the MS 325. The MS then transmits a registration request to the femtocell system 350 (step 604). The register message may include the MS's MIN, ESN or p-ESN, the authentication result (AUTHR), a CallHistoryCount (COUNT), and a random confirmation (RANDC) derived from the random number (RAND) used to compute the authentication result (AUTHR).

On receiving the registration request from the MS 325, the femtocell system 350 sends a SIP:REGISTER message to the CS 322 (step 606) in accordance with an embodiment that includes the unique register ID associated with the MS, e.g., derived from an MIN or an IMSI paired with either an MEID, an ESN, or a p-ESN.

Optionally, the femtocell system 350 may establish an IPsec tunnel with the PDIF 332. The CS 322 then acknowledges receipt of the SIP:REGISTER message by transmitting a 200 OK SIP response to the femtocell system 350 (step 608).

A registration phase is then invoked by the femtocell system 350 transmitting 1x authentication parameters received from the MS 325 at step 604 to CS 322 in a SIP: MESSAGE (LOCATION_UPDATING_REQUEST) (step 610). The location updating request message includes the random number (RAND) rather than the random number confirmation (RANDC). The location updating request message additionally may include parameters, such as a Register ID, ESN, MEID, MIN, IMSI, etc. Using the Register ID, the CS 322 may associate the location updating request with the preceding SIP:REGISTER request received thereby from the femtocell system 350 in step 606. If the location updating request message includes a P-Access-Network-Info (PANI) header that may specify information about the access technology, the CS 322 may save the PANI information.

The CS 322 acknowledges receipt of the location updating request message by transmitting a 200 OK SIP response to the femtocell system 350 (step 612). Network authentication and registration then occurs via exchanges between the CS 322 and HLR/AC (step 614). As part of the authentication response, the HLR/AC may trigger Unique Challenge, SSD update, or CountUpdate procedures.

The CS 322 informs the femtocell system 350 of the authentication and registration results by transmitting a SIP location updating response message to the femtocell system 350 (step 616). In the event of an authentication or registration failure, the CS 322 may send a SIP:MESSAGE containing, for example, an XML-encoded message body that facilitates deregistration of the femtocell system 350. The femtocell system 350 acknowledges receipt of the authentication and registration results by sending a 200 OK SIP response to the CS 322 (step 618). In the event of either a registration or authentication failure, a deregistration process 630 is invoked by the femtocell system 350 transmitting a deregistration message, e.g., a SIP: REGISTER message with an expire value "0", to the CS 322 (step 620). The CS 322 acknowledges receipt of the deregistration message by transmitting a 200 OK SIP response to the femtocell system 350 (step 622).

Figure 7:
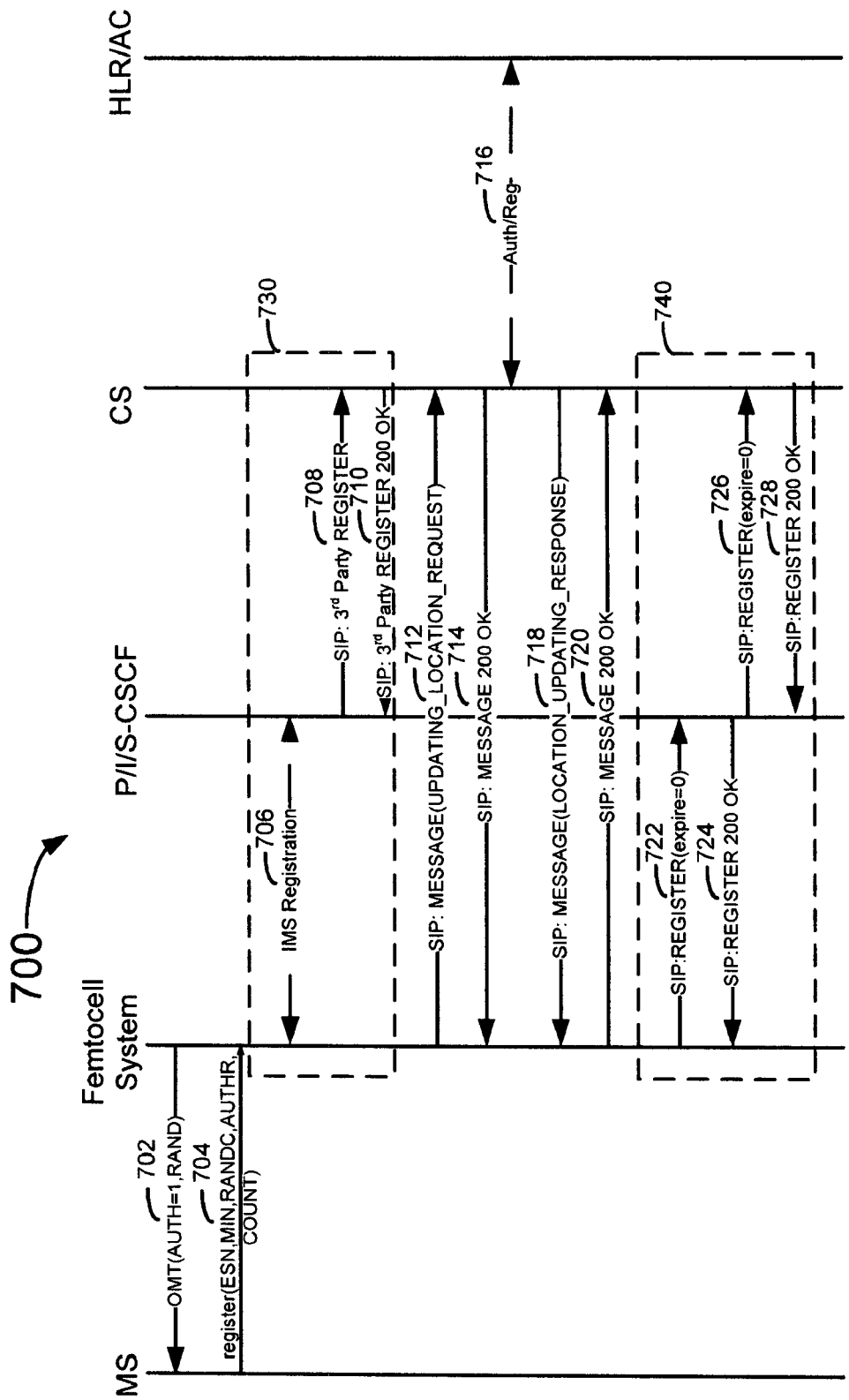
FIG. 7 depicts a diagrammatic representation of a registration and authentication process on initial system access by a mobile station via a femtocell system in an Internet Protocol Multimedia Subsystem network implemented in accordance with an embodiment.

FIG. 7 depicts a diagrammatic representation of a registration and authentication process 700 on initial system access by an MS via a femtocell system in an IMS network, such as network system 301 depicted in FIG. 3B, implemented in accordance with an embodiment. In this implementation, it is assumed that the MS comprises a standard 1x mobile phone and the femtocell system 350 is configured to operate as an IMS client on behalf of the mobile stations attached with the femtocell system 350. When an MS attempts to establish a connection with the femtocell system 350, the femtocell system 350 first attempts to register in the IMS network on behalf of the MS. As part of the registration, the IMS network may perform IMS-AKA authentication or, alternatively, allow the registration without performing any authentication. Further, in the described implementation, it is assumed that the CS 322 is configured to act as an application server (AS) in the IMS domain, and that it receives 3rd-party registration requests from the S-CSCF at the end of the IMS network registration process.

The femtocell system 350 transmits an OMT (step 702) at a predefined interval. An MS 325 in idle mode may detect the OMT when the MS 325 is within range of the femtocell system 350 as described above with reference to FIG. 3A. The OMT transmitted by the femtocell system 350 may include an authentication bit (AUTH) having a value, e.g., "1", that indicates authentication is required for all system access, and a random number (RAND) generated by the femtocell system 350. On receipt of the OMT, the MS determines that a new serving system has been encountered and that authentication is required based on the authentication bit value (AUTH=1). Subsequently, the MS 325 attempts to obtain the random number (RAND) to be used for the authentication from the OMT. If the random number is not available, a zero value may be used by the MS as prescribed by TR-45 authentication procedures. The MS 325 then generates an authentication result (AUTHR), and transmits a registration request to the femtocell system 350 (step 704). The registration message may include the MS's MIN, ESN or p-ESN, the authentication result (AUTHR), a CallHistoryCount (COUNT), and a random number confirmation (RANDC) derived from the random number (RAND) used to compute the authentication result (AUTHR).

An IMS registration phase 730 is then initiated by the femtocell system 350 sending a registration request to the S-CSCF (step 706). The S-CSCF then sends a 3rd-party registration request to the CS 322 (step 708), and the CS 322 returns a 200 OK SIP response to the S-CSCF (step 710) for the 3rd-party registration which completes the IMS network registration.

If the registration fails, the CS 322 informs the femtocell system 350 to perform IMS network deregistration. Assuming the registration is successful, an authentication process is then invoked by the femtocell system 350 transmitting 1x authentication parameters received from the MS 325 at step 704 to CS 322 in a SIP: MESSAGE(LOCATION_UPDATING_REQUEST) (step 712). The location updating request message includes the random number (RAND) rather than the random number confirmation (RANDC). The location updating request message additionally may include parameters, such as a Register ID, ESN, MEID, MIN, IMSI, etc. If the location updating request message includes a P-Access-Network-Info (PANI) header that may specify information about the access technology, the CS 322 saves the PANI information.

The CS 322 acknowledges receipt of the location updating request message by transmitting a 200 OK SIP response to the femtocell system 350 (step 714). Network authentication and registration then occurs via exchanges between the CS 322 and HLR/AC (step 716). As part of the authentication response, the HLR/AC may trigger Unique Challenge, SSD update, or CountUpdate procedures.

The CS 322 informs the femtocell system 350 of the authentication and registration results by transmitting a SIP location updating response message to the femtocell system 350 (step 718). In the event of an authentication or registration failure, the CS 322 may send a SIP:MESSAGE containing, for example, an XML-encoded message body that facilitates deregistration of the femtocell system 350. The femtocell system 350 acknowledges receipt of the authentication and registration results by sending a 200 OK SIP response to the CS 322 (step 720).

In the event of either a registration or authentication failure, a deregistration process 740 is invoked by the femtocell system 350 transmitting a deregistration message, e.g., a SIP: REGISTER message with a expire value "0", to the S-CSCF (step 722). The S-CSCF acknowledges receipt of the deregistration message by transmitting a 200 OK SIP response to the femtocell system 350 (step 724). The S-CSCF then transmits the deregistration message to the CS 322 (step 726) which acknowledges receipt of the deregistration message by transmitting a 200 OK SIP response to the S-CSCF (step 728) thereby completing deregistration of the MS.

The CS 322 may receive a SIP:REGISTER message for a subscriber who is not currently SIP registered, but for whom the CS 322 maintains subscription data from the HLR. For example, the CS 322 may maintain the HLR subscription information for a configurable period after a SIP deregistration. In this scenario, a MS re-registration procedure may be invoked. The re-registration may be consistent with that as described above with reference to FIG. 6 except the CS 322 is not required to request the user profile from the HLR.

Periodic registration is optionally required in mobile networks. If periodic registration is enabled, the HLR may return an "Authorization Period" in response to a Registration Notification (REGNOT). In this case, the CS 322 may send a SIP:MESSAGE (ORDERED_REGISTRATION_REQUEST) before the "Authorization Period" expires. On receiving this request, the femtocell system 350 may send the ordered registration request to the MS 325 to send registration-related parameters.

Regardless of an "Authorization Period" timer, the SIP registration period dictates the interval at which the SIP registration from the femtocell system 350 needs to be refreshed. In such a case, the femtocell system 350 needs to refresh the registration prior to the expiration period while the MS 325 is attached to the femtocell system 350. Such registration procedures are preferably processed locally at the CS 322. The femtocell system 350 sends a SIP:REGISTER message to the CS 322, and the CS 322 returns a SIP 200 OK response to the femtocell system 350.

When deregistration occurs, e.g., either due to registration timeout or mobile-initiated/network deregistration, the CS 322 may typically not delete HLR subscriber data which is eligible to be aged out, or removed by a REGCANC message. The CS 322 may send a mobile station inactive (MSINACT) message to the HLR with the optional DeregistrationType parameter omitted which indicates that subscriber data is still being maintained by the CS 322. Such a situation may occur, for example, due to the MS 325 being powered off and it is desirable to have the subscription data available when the MS is powered back on. However, the time the MS was last registered is maintained with the subscription data.

If the MS does not re-register for a configurable time (e.g., 24 hours), the subscriber data may be deleted and an MSINACT message is sent to the HLR with the DeregistrationType set to "administrative reason" indicating that the subscriber data has been purged from the CS 322. This may also occur as needed to free up space in the database thereby deleting the oldest data first based on when it was last accessed.

A mobile initiated de-registration process may be invoked when the CS 322 receives a SIP:REGISTER from the femtocell system 350 with a timeout of zero for a current registration. In an IMS network, the CS 322 may receive this message from the S-CSCF as a 3rd-party SIP:REGISTER message. For example, such a de-registration may occur when the femtocell system 350 receives a power-down indication from the MS, the femtocell system 350 detects MS inactivity, or the femtocell system 350 detects a loss of radio contact.

Deregistration may additionally occur due to location updating. When the MS registers in a macrocell, the HLR preferably notifies the CS 322 accordingly. If the SIP registration for the corresponding MS is currently active, the CS 322 may send a SIP:MESSAGE (Deregister) to the femtocell system 350 requesting it to deregister. Registration cancellation may additionally occur due to administrative reasons as well. In such a case, the MS may be in a call or using some network service. If the cancellation indicates that service is to be discontinued immediately, the CS 322 terminates any call in progress.

In accordance with disclosed embodiments, mechanisms that facilitate mobile originated voice calls are provided. In the disclosed embodiments, it is assumed that the MS is fully registered.

Figure 8:
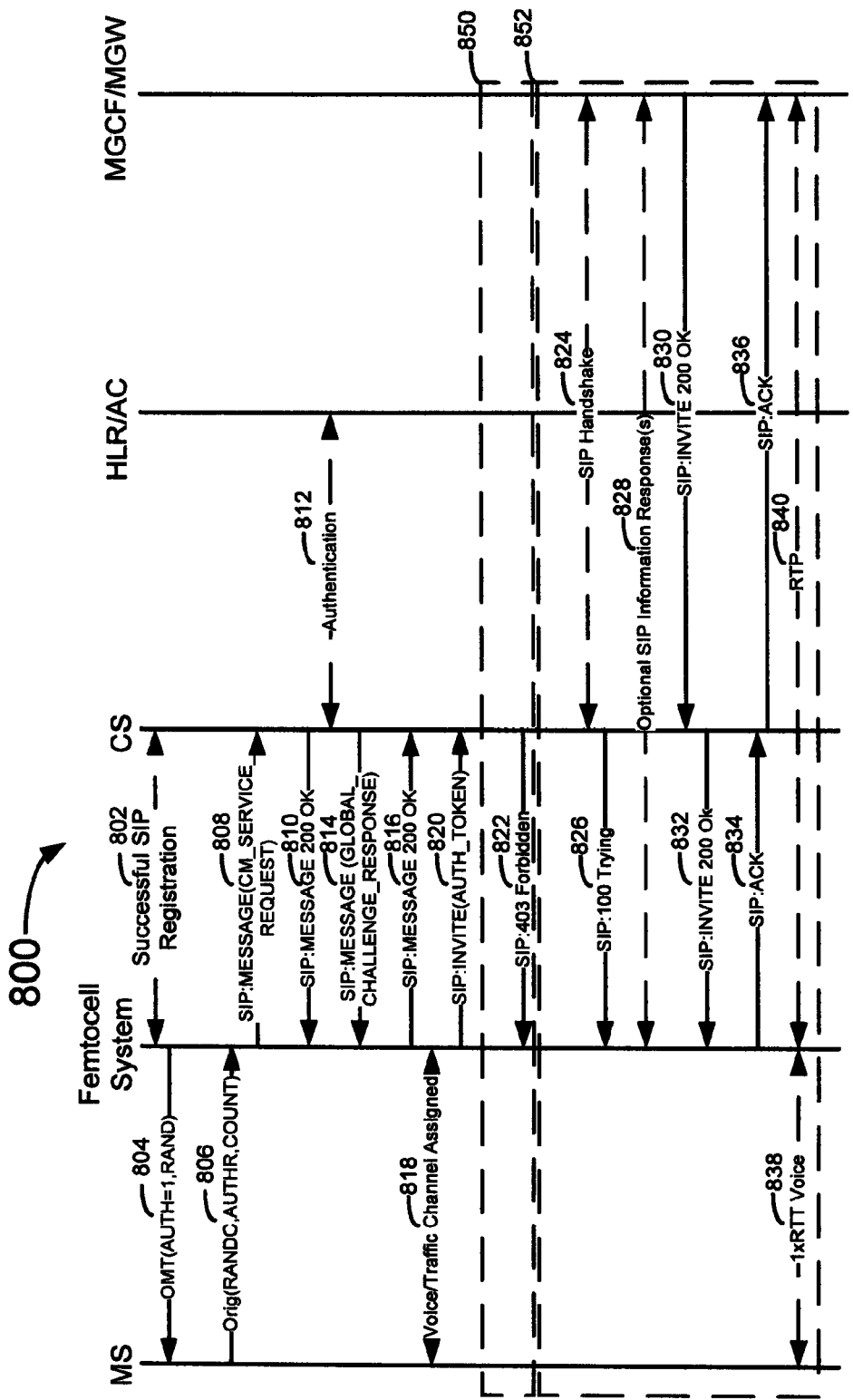
FIG. 8 depicts a diagrammatic representation of a signaling flow of a successful mobile originated voice call implemented in accordance with an embodiment.

FIG. 8 depicts a diagrammatic representation of a signaling flow 800 of a mobile originated voice call implemented in accordance with an embodiment. The MS is successfully registered in the network system (step 802), e.g., via a SIP registration process. The MS then determines that authentication is required on all system accesses, e.g., on receipt of the Overhead Message Train (OMT) that includes an authentication value (e.g., AUTH=1) that indicates authentication is required (step 804). The random number (RAND) to be used for authentication may also be obtained by the MS from the OMT. If it is not, a zero value may be used by the MS as prescribed by TR-45 authentication. The MS executes an instance of the CAVE algorithm using the dialed digits, the RAND, the ESN/p-ESN, and the SSD currently stored to produce an origination Authentication Result (AUTHR).

The MS then sends an origination message to the femtocell system providing the dialed digits, its MIN, ESN/p-ESN, the Authentication Result (AUTHR), the CallHistoryCount (COUNT), and the RANDC from the RAND used to compute the Authentication Result (AUTHR) (step 806). The femtocell system, on receipt of the call origination attempt by the MS, sends 1x authentication data in a service request message required for the authentication using SIP: MESSAGE (CM_SERVICE_REQUEST) to the CS (step 808), and the CS acknowledges receipt thereof by returning a SIP 200 OK response (step 810). The CS then engages the HLR/AC to authenticate the MS (step 812).

The CS then forwards the result of the authentication to the femtocell system using a SIP message including a global challenge response (GLOBAL_CHALLENGE_RESPONSE) along with the encryption information received from the HLR/AC and a locally generated authentication token (step 814). The femtocell system presents the authentication token received in the global challenge response to the CS in a subsequent SIP:INVITE message to initiate a SIP voice call. The CS may deny the establishment of SIP calls if this token is not received. The femtocell system acknowledges receipt of the SIP:MESSAGE by returning a SIP 200 Ok response to the CS (step 816). The femtocell system may then establish the voice/traffic channel with the MS (step 818). The femtocell system then sends a SIP:INVITE message that includes the called and calling party numbers (e.g., as MDNs) to the CS along with the authentication token previously received from the CS (step 820). The INVITE content-type may be multipart/mixed with SDP in one message body and the authentication token in a separate message body.

In the event the validation of the authentication token received in the SIP:INVITE fails (block 850), the CS sends a "SIP:403 Forbidden" to the femtocell system to indicate the authentication failure (step 822).

In case of a successful validation of the authentication token, the CS applies subscription checks to the call. If all the checks are successful (block 852), a SIP call setup handshake is invoked (step 824) between the CS and a MGCF/MGW, and the CS notifies the femtocell system that the call is being attempted to be placed, e.g., by transmitting a SIP:100 Trying message to the femtocell system (step 826). Optional SIP information responses may be exchanged between the femtocell system and the MGCF/MGW (step 828). In the event the call is successfully placed, the MGCF/MGW may transmit a SIP:INVITE 200 Ok message to the CS (step 830), which forwards the message to the femtocell system (step 832). The femtocell system acknowledges the SIP:INVITE 200 Ok with the CS (step 834), which forwards the acknowledgement to the MGCF/MGW (step 836). A 1xRTT voice connection is then established between the MS and the femtocell system (step 838), and an RTP session is established between the femtocell system and the MGW (step 840).

If the mobile originated call is prohibited, e.g., by operator-determined barring, a call barring supplementary service, or by the failure of an attempt to use any supplementary service, the call is rejected by the CS. In this instance, the femtocell system sends a SIP:INVITE to the CS which returns a "100 Trying" message to the femtocell system. The CS then returns a SIP("603 Declined") message to the femtocell system which acknowledges the call declined message.

Figure 9A:
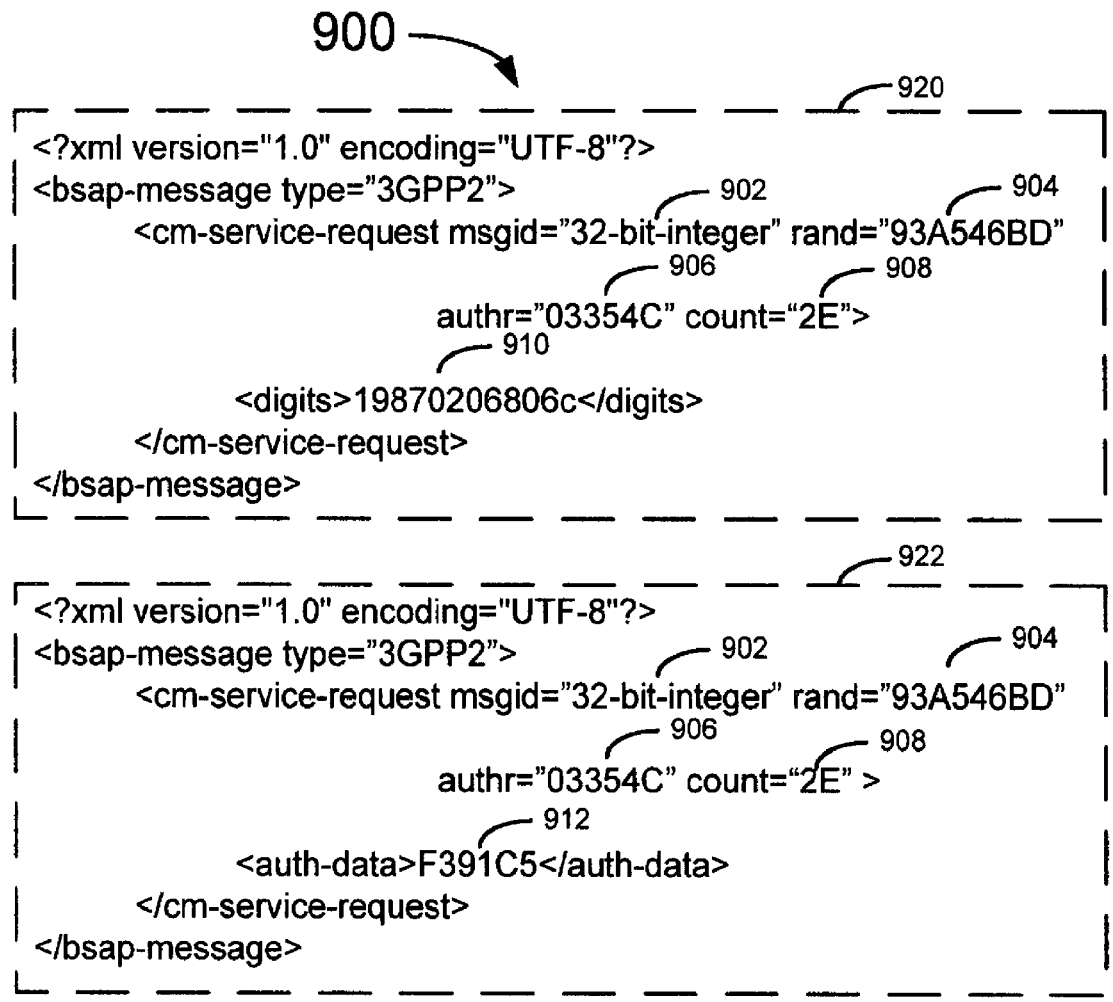
FIG. 9A is a diagrammatic representation of a service request message transmitted to the convergence server from a femtocell system implemented in accordance with an embodiment.

FIG. 9A is a diagrammatic representation of a service request message 900 transmitted to the CS from the femtocell system implemented in accordance with an embodiment. The service request message 900 transmitted to the CS, e.g., according to step 808 of FIG. 8, may be generated by the femtocell system in response to receipt of a call origination from a MS. The service request message 900 may be implemented as a SIP message including the depicted XML-encoded service request message.

The service request message 900 is transmitted from the femtocell system 350 to the CS 322 to authenticate an MS when originating a mobile initiated call or short message. In an embodiment, the service request message 900 may include a message body 920 that includes a service request message ID field 902 in which the femtocell system 350 provides a message identifier, e.g., a 32 bit message identifier, to facilitate correlation between the request and response(s). When a global challenge results in a unique challenge, SSD update, and/or count update, the CS 322 may include the same message ID in those transactions. The femtocell system 350 may initiate a maximum timer for response to the service request that is initiated after receiving the 200 OK response from the CS for the service request, e.g., according to step 810 of FIG. 8. The timer is stopped when the global challenge response is received by the femtocell system, e.g., according to step 814 of FIG. 8. If the service request results in an SSD Update, Unique Challenge, and/or count update, the timeout may be increased accordingly. The service request message 900 may additionally include a random number field 904 that includes the random number (RAND) provided to the MS, e.g., according to step 804, used for authentication, an authentication response field 906 that includes the authentication response (AUTHR) generated by the MS, and a count field 908. Further, the service request message body 920 may include the calling party number digits 910. Alternatively, a service request message body 922 may include authentication data 912 in lieu of the calling party number digits.

FIG. 9B is a diagrammatic representation of a global challenge response message 940 transmitted to the femtocell system 350 from the CS 322 in accordance with an embodiment. The global challenge response message 940 transmitted to the femtocell system, e.g., according to step 814 of FIG. 8, may be generated by the CS in response to the authentication procedure performed between the CS and MGCF/MGW according to step 812 of FIG. 8. The global challenge response message 940 may be implemented as a SIP message including the depicted XML-encoded global challenge response message.

The global challenge response message 940 is transmitted from the CS 322 to the femtocell system 350 in response to a service request and paging authentication request to convey the global challenge authentication result, authentication token, and the encryption information (CDMAPrivateLongCodeMask (CDMAPLCM), SignalingMessage EncryptionKey (SMEKEY), and VoicePrivacyMask (VPMASK) received from the AC. To this end, the global challenge response message 940 may include a global challenge response message ID field 942, a successful authentication field 944 that includes an identifier, e.g., a Boolean value, that specifies whether the authentication was successful, and an authentication token field 946 that includes the authentication token. Further, the global challenge response message 940 may include a CDMAPLCM field 948 that includes the CDMA private long code mask, a SMEKEY field 950 that includes the signaling message encryption key, and a VPMASK field 952 that includes the voice privacy mask in the event of a successful authentication.

FIG. 9C is a diagrammatic representation of an authentication token message 960 transmitted from the femtocell system 350 to the CS 322 in accordance with an embodiment. The authentication token message 960 may be transmitted to the CS, e.g., according to step 820 of FIG. 8. The authentication token message 960 may be implemented as a SIP message including the depicted XML-encoded authentication token. The authentication token message is sent from the femtocell system 350 to the CS 322 in the service request (e.g., voice call, SMS) sent after a successful authentication. The authentication token message 960 includes an authentication token field 962 that includes the authentication token received in the previous global challenge response.

In accordance with an embodiment, mobile terminated calls exist in two phases: the SS7 phase where the public land mobile network (PLMN) is obtaining routing information for the call, and the SIP phase when the softswitch/MGCF forwards the SIP:INVITE to the CS 322. The following description of a mobile terminated call assumes the MS is fully registered.

Figure 10:
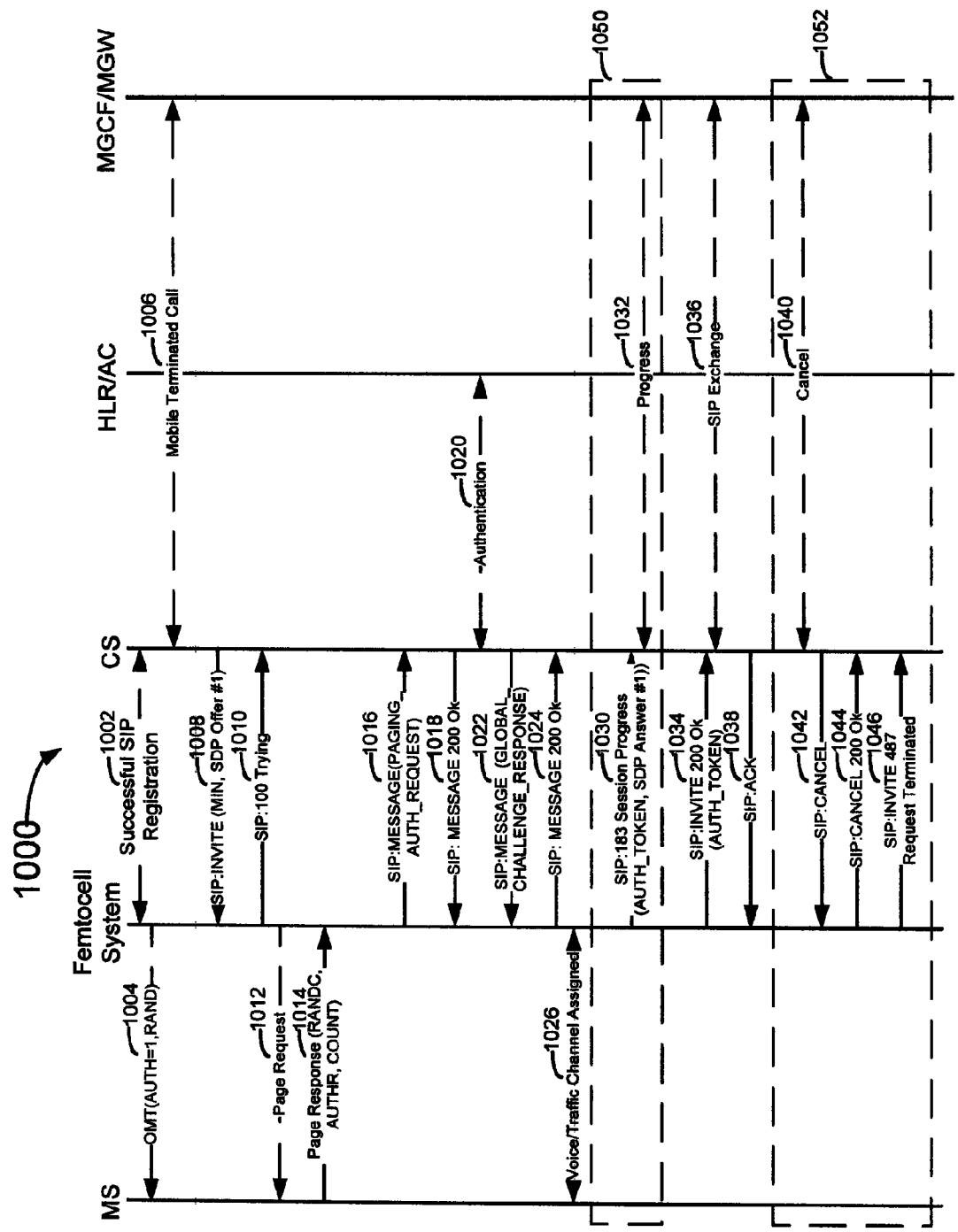
FIG. 10 depicts a diagrammatic representation of a signaling flow of a mobile terminated voice call implemented in accordance with an embodiment.

FIG. 10 depicts a diagrammatic representation of a signaling flow 1000 of a mobile terminated voice call implemented in accordance with an embodiment. The MS is successfully registered in the network system (step 1002), e.g., via a SIP registration process. The femtocell system broadcasts that authentication is required on all system accesses, e.g., by including an authentication value (e.g., AUTH=1) that indicates authentication is required in the Overhead Message Train (OMT) along with the Random Number (RAND) to be used for authentication (step 1004).

A mobile terminated call may then occur that is to be terminated with an MS attached with the femtocell system 350 (step 1006). The CS 322 then performs all validations for the incoming call against the subscriber profile. If any SS services are active, the service may be invoked (if needed). Assuming the MS is free to receive the call, the CS 322 forwards a SIP: INVITE message that includes the called party MIN to the femtocell system 350 serving the MS (step 1008), and the femtocell system may acknowledge the SIP: INVITE by sending a "SIP: 100 Trying" message to the CS 322 (step 1010). Additionally, the femtocell system 350 attempts to page the MS corresponding to the MIN of the INVITE (step 1012). Upon recognizing the page message with its MIN, the MS executes an instance of the CAVE algorithm using the SSD-A currently stored by the MS, the ESN/p-ESN, the MIN1, and the RAND value to produce a termination authentication result (AUTHR). The MS then sends the page response message to the femtocell system 350 which includes the MS's MIN, ESN/p-ESN, the authentication result (AUTHR), a CallHistoryCount(COUNT) and the RANDC derived from the RAND used to compute the authentication result AUTHR (step 1014).

The femtocell system 350 forwards the 1x authentication data received from the MS to the CS 322 using a SIP paging authentication request (SIP: MESSAGE (PAGING_AUTH_REQUEST) (step 1016). The CS 322 acknowledges the SIP:MESSAGE by sending a SIP "200 OK" message to the femtocell system (step 1018). The CS 322 may then engage in an authentication procedure with the HLR/AC (step 1020).

The CS 322 then forwards the result of the authentication process to the femtocell system 350 using a SIP global challenge response message (SIP:MESSAGE(GLOBAL_CHALLENGE_RESPONSE)) along with the encryption information received from the HLR/AC and a locally generated authentication token (step 1022). The femtocell system 350 may present the authentication token received in the global challenge response in all subsequent SIP:INVITE response messages (e.g., 183 Session Progress, 200 OK, etc.). Otherwise, the CS 322 may deny the establishment of SIP calls if this token is not received in any of the SIP response messages. The femtocell system 350 acknowledges the receipt of the SIP:MESSAGE (step 1024). At this point, the femtocell system 350 can establish the voice/traffic channel to the MS (step 1026).

Optional informational (1xx) SIP responses (block 1050) (e.g., "183 Session Progress", "180 Ringing", etc.) may be exchanged. Thus, a SIP session progress message may optionally be transmitted from the femtocell system 350 to the CS 322 (step 1030), and an optional progress exchange may be performed between the MGCF/MGW (step 1032). In the event the femtocell system 350 sends any of the informational messages, the authentication token it received by the femtocell system 350 from the CS 322 is preferably included.

The femtocell system 350 sends a SIP INVITE message including the authentication token to the CS 322 (step 1034), and a SIP exchange is then performed between the CS 322 and the MGCF/MGW (step 1036). The CS 322 then provides an acknowledgement to the femtocell system 350 (step 1038) resulting in a 1xRTT voice connection between the MS and the femtocell system 350, and an RTP session between the femtocell system 350 and the MGW. The femtocell system includes the authentication token along with the authentication result in a SIP: 200 OK message.

In the event of authentication token validation failure (block 1052), the CS 322 transmits a cancel message to the MGCF (step 1040), and transmits a "SIP:CANCEL" message for the INVITE to the femtocell system 350 (step 1042). The femtocell system 350 acknowledges the SIP:CANCEL by sending a SIP "200 OK" message to the CS 322 (step 1044), and a "SIP: 487 Request Terminated" message to the CS 322 for the SIP:INVITE (step 1046).

The mobile terminated call may be rejected at various stages. For example, if the HLR finds that a subscriber does not exist for which a location request has been sent, the HLR returns an error to the GMSC. In another case, during ROUTREQ, when the CS 322 determines that the MS is inactive or unavailable, it returns an error code as Inactive/Unavailable. Mobile initiated voice call termination procedures may be invoked when an existing call is in progress by the MS transmitting a call termination message. In this instance, the femtocell system 350 transmits a BYE message for the existing call to the CS 322, which, in turn, sends a BYE message to the MGCF. The MGCF then sends a "200 OK" SIP message for the BYE message to the CS 322, which forwards the "200 OK" SIP message to the femtocell system 350.

MGCF (Network) Initiated Termination of an existing call may be invoked by a user agent (UA) behind the MGCF initiating termination of the call. In this instance, the MGCF sends a BYE message for the existing call to the CS 322 which forwards the BYE message to the femtocell system 350. The femtocell system then sends a "200 OK" SIP message for the BYE to the CS 322, and the CS transmits a "200 OK" SIP message to the MGCF.

FIG. 11 is a diagrammatic representation of a paging authentication request message 1100 transmitted from the femtocell system 350 to the CS 322 in accordance with an embodiment. The paging authentication request message 1100 may be transmitted to the CS, e.g., according to step 1016 of FIG. 10. The paging authentication request message 1100 may be implemented as a SIP message including the depicted XML-encoded paging authentication request message.

The paging authentication request message 1100 is transmitted from the femtocell system 350 to authenticate the MS before delivering a mobile terminated call or short message. The femtocell system 350 preferably includes a 32 bit message identifier in a paging authentication request message ID field 1102 to correlate the request and the response(s). When a global challenge results in a unique challenge, SSD update, and/or count update, the CS will include the same message in those transactions. The femtocell system 350 preferably invokes a maximum timer for response to the paging authentication request message. For example, the femtocell system 350 may invoke the timer after receiving the 200 OK response from the CS for the paging authentication request transmitted to the CS. The timer may be stopped when the global challenge response is received by the femtocell system according to step 1022 of FIG. 10. If the paging authentication request results in an SSD update, a unique challenge, and/or a count update, the timeout may be increased accordingly.

The paging authentication request message 1100 preferably includes a random number field 1104 that includes the random number (RAND) used for authentication, an authentication result field 1106 that includes the authentication result (AUTHR), and a count field 1108.

As described, mechanisms for facilitating processing of a mobile-originated voice call for a mobile station attached with a femtocell system are provided. The femtocell system may broadcast a notification that authentication is required for all system access, e.g., via an overhead message train. The femtocell system receives a call origination request from the mobile station and, in turn, issues a service request message to a convergence server deployed in a core network. The convergence server then engages in an authentication procedure with the mobile station's mobile core network and returns a global challenge response to the femtocell system. Then convergence server may then determine if the mobile station is to be validated and, if so, may continue call set up for the call origination request.

The illustrative block diagrams depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the present invention may be implemented in software, hardware, firmware, or a combination thereof. The various elements of the system, either individually or in combination, may be implemented as a computer program product tangibly embodied in a machine-readable storage device for execution by a processing unit. Various steps of embodiments of the invention may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying the aspects of the present invention can be loaded onto a computer. The computer program is not limited to any particular embodiment, and may, for example, be implemented in an operating system, application program, foreground or background process, driver, network stack, or any combination thereof, executing on a single processor or multiple processors. Additionally, various steps of embodiments of the invention may provide one or more data structures generated, produced, received, or otherwise implemented on a computer-readable medium, such as a memory.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method of facilitating processing of a mobile-originated voice call for a mobile station attached with a femtocell system, comprising:
   receiving, by the femtocell system, a call origination request from the mobile station;
   in response to receiving the call origination request, transmitting, by the femtocell system, authentication data in a service request message to a convergence server deployed in a core network;
   receiving, by the femtocell system, a global challenge response from the convergence server in response to sending the authentication data, wherein the global challenge response includes an authentication token that is stored at the femtocell for subsequent transmission from the femtocell back to the convergence server; and
   receiving, by the femtocell system, a determination of validation for the voice call from the convergence server.

2. The method of claim 1, further comprising notifying, by the femtocell system, the mobile station that authentication is required by the mobile station for system access.

3. The method of claim 1, further comprising initiating, by the convergence server, an authentication procedure with a mobile core network responsive to receipt of the service request message from the femtocell system.

4. The method of claim 1, further comprising transmitting, by the femtocell system, a Session Initiation Protocol Invite message to the convergence server that includes the authentication token.

5. The method of claim 1, further comprising establishing, by the femtocell system, a voice channel with the mobile station responsive to receipt of the global challenge response.

6. The method of claim 1, wherein the call origination request includes an origination authentication result generated by the mobile station.

7. The method of claim 6, wherein the origination authentication result is generated by the mobile station using a random number provided thereto by the femtocell system, an electronic serial number of the mobile station, dialed digits of the call origination request, and a shared secret data key stored by the mobile station.

8. A non-transitory computer-readable medium having computer-executable instructions tangibly embodied thereon for execution by a processing system, the computer-executable instructions for facilitating processing of a mobile-originated voice call for a mobile station attached with a femtocell system that, when executed, cause the processing system to:
   notify, by the femtocell system, the mobile station that authentication is required by the mobile station for system access;
   receive, by the femtocell system, a call origination request from the mobile station;
   in response to receiving the call origination request, transmit, by the femtocell system, authentication data in a service request message to a convergence server deployed in a core network;
   receive, by the femtocell system, a global challenge response from the convergence server in response to sending the authentication data, wherein the global challenge response includes an authentication token that is stored at the femtocell for subsequent transmission from the femtocell back to the convergence server; and
   receive, by the femtocell system, a determination of validation for the voice call from the convergence server.

9. The non-transitory computer-readable medium of claim 7, further comprising instructions that, when executed by the processing system, cause the processing system to initiate, by the convergence server, an authentication procedure with a mobile core network responsive to receipt of the service request message from the femtocell system.

10. The non-transitory computer-readable medium of claim 8, further comprising instructions that, when executed by the processing system, cause the processing system to transmit, by the femtocell system, a Session Initiation Protocol Invite message to the convergence server that includes the authentication token.

11. The non-transitory computer-readable medium of claim 8, further comprising instructions that, when executed by the processing system, cause the processing system to establish, by the femtocell system, a voice channel with the mobile station responsive to receipt of the global challenge response.

12. The non-transitory computer-readable medium of claim 8, wherein the call origination request includes an origination authentication result generated by the mobile station.

13. The non-transitory computer-readable medium of claim 12, wherein the origination authentication result is generated by the mobile station using a random number provided thereto by the femtocell system, an electronic serial number of the mobile station, dialed digits of the call origination request, and a shared secret data key stored by the mobile station.

14. A network system that facilitates processing of a mobile-originated voice call for a mobile station attached with a femtocell system, comprising:
 a core network that includes a convergence server;
 a mobile core network that includes an authentication center and a Home Location Register; and
 an Internet Protocol-based femtocell system that provides a radio access point for a mobile station, wherein the femtocell system receives a call origination request from the mobile station, in response to receiving the call origination request transmits authentication data in a service request message to the convergence server, receives a global challenge response from the convergence server in response to sending the authentication data, wherein the global challenge response includes an authentication token that is stored at the femtocell for subsequent transmission from the femtocell back to the convergence server, and receives a determination of validation for the voice call from the convergence server.

15. The system of claim 14, wherein the femtocell system notifies the mobile station that authentication is required by the mobile station for system access by broadcast of an overhead message train.

16. The system of claim 14, wherein the core network that includes the convergence server comprises one of an Internet Protocol core network and an Internet Multimedia Subsystem core network.

17. The system of claim 14, wherein the convergence server initiates an authentication procedure with the authentication center and the Home Location Register responsive to receipt of the service request message from the femtocell system.

\* \* \* \* \*